(12) United States Patent
Femi-Fowode et al.

(10) Patent No.: US 12,281,620 B1
(45) Date of Patent: Apr. 22, 2025

(54) SYSTEM AND METHOD FOR BLENDING MULTIPLE FUELS

(71) Applicant: GE Infrastructure Technology LLC, Greenville, SC (US)

(72) Inventors: Temitayo O. Femi-Fowode, SE Smyrna, GA (US); Alston Ilford Scipio, Mableton, GA (US); Adenuga Moshood Adelakun, Winnipeg (CA); Oyebimpe B. Olubode, Toronto (CA); Colin Noel Stevens, Atlanta, GA (US); John Karigiannis, Laval (CA)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/734,201

(22) Filed: Jun. 5, 2024

(51) Int. Cl.
| | |
|---|---|
| F02C 7/224 | (2006.01) |
| F02C 7/232 | (2006.01) |
| F02C 9/26 | (2006.01) |
| F02C 9/28 | (2006.01) |
| F02C 9/40 | (2006.01) |
| F23R 3/36 | (2006.01) |

(52) U.S. Cl.
CPC ............... *F02C 9/40* (2013.01); *F02C 7/224* (2013.01); *F02C 7/232* (2013.01); *F02C 9/263* (2013.01); *F02C 9/28* (2013.01); *F23R 3/36* (2013.01)

(58) Field of Classification Search
CPC .... F02C 9/26; F02C 9/263; F02C 9/28; F02C 9/40; F02C 7/22; F02C 7/224; F02C 7/232; F23R 3/28; F23R 3/36
See application file for complete search history.

(56) References Cited

U.S. PATENT DOCUMENTS 4,761,948 A * 8/1988 Sood ................. F23R 3/36
60/39.463
4,833,878 A * 5/1989 Sood ................. F02C 9/40
60/39.463

(Continued)

OTHER PUBLICATIONS

Elkady et al., Application of Exhaust Gas Recirculation in a DLN F-Class Combustion System for Postcombustion Carbon Capture, Journal Engineering for Gas Turbines and Power, vol. 131, Issue 3, 2009, 034505, 6 pages. (Abstract Only) https://doi.org/10.1115/1.2982158.

(Continued)

*Primary Examiner* — William H Rodriguez
(74) *Attorney, Agent, or Firm* — Dority & Manning, P.A.

(57) ABSTRACT

A method of blending at least two fuels includes providing at least two fuels to a helical static mixer via a fuel supply system, the fuel supply system including a fuel supply circuit for each fuel of the at least two fuels, mixing, via a plurality of helical structures of the helical static mixer, the at least two fuels to form a fuel mixture, determining, via one or more sensors, a measured interchangeability index of the fuel mixture, comparing the measured interchangeability index to a predetermined interchangeability index, adjusting, via the fuel supply system, one or more parameters of at least one of the at least two fuels based on the comparison between the measured interchangeability index and the predetermined interchangeability index, and providing the fuel mixture to a combustion system.

20 Claims, 15 Drawing Sheets

(56) References Cited

U.S. PATENT DOCUMENTS

| | | | | |
|---|---|---|---|---|
| 5,411,393 | A * | 5/1995 | Askin | F23D 14/02 |
| | | | | 431/186 |
| 5,430,691 | A * | 7/1995 | Fridman | F23C 15/00 |
| | | | | 367/145 |
| 7,416,404 | B2 | 8/2008 | Chan | |
| 7,895,821 | B2 * | 3/2011 | Annigeri | F02C 3/22 |
| | | | | 60/39.463 |
| 7,950,216 | B2 | 5/2011 | Dooley et al. | |
| 8,355,819 | B2 * | 1/2013 | Kirzhner | F02C 9/40 |
| | | | | 700/274 |
| 8,356,484 | B2 * | 1/2013 | Snider | F02C 7/224 |
| | | | | 60/734 |
| 8,627,668 | B2 * | 1/2014 | Thompson | F02C 9/40 |
| | | | | 60/776 |
| 8,650,851 | B2 * | 2/2014 | Ouellet | F02C 9/40 |
| | | | | 60/734 |
| 9,080,513 | B2 | 7/2015 | Ziminsky et al. | |
| 9,856,795 | B2 * | 1/2018 | Higashi | F02C 9/28 |
| 9,920,696 | B2 * | 3/2018 | Emberger | F02C 9/34 |
| 10,844,788 | B2 | 11/2020 | Zhang et al. | |
| 11,248,536 | B2 * | 2/2022 | Minto | F02C 3/30 |
| 11,852,082 | B2 * | 12/2023 | Frey | F23R 3/36 |
| 2006/0150631 | A1 * | 7/2006 | Smith | F02C 7/22 |
| | | | | 60/734 |
| 2010/0162678 | A1 * | 7/2010 | Annigeri | F02C 3/22 |
| | | | | 60/39.463 |
| 2010/0205976 | A1 * | 8/2010 | Nag | F02C 9/40 |
| | | | | 60/775 |
| 2011/0162343 | A1 * | 7/2011 | Ouellet | F02C 9/40 |
| | | | | 60/39.281 |
| 2012/0036863 | A1 * | 2/2012 | Kirzhner | F02C 7/22 |
| | | | | 60/776 |
| 2012/0079831 | A1 * | 4/2012 | Kirzhner | F02C 7/264 |
| | | | | 60/776 |
| 2013/0305735 | A1 * | 11/2013 | Ahn | F02C 9/26 |
| | | | | 60/776 |
| 2014/0043932 | A1 | 2/2014 | Russell et al. | |
| 2014/0260309 | A1 * | 9/2014 | Menon | F23R 3/36 |
| | | | | 60/734 |
| 2015/0354466 | A1 * | 12/2015 | Higashi | F02C 9/263 |
| | | | | 60/776 |
| 2016/0290214 | A1 * | 10/2016 | Ekanayake | F02M 31/16 |
| 2017/0363015 | A1 * | 12/2017 | Minto | F23N 5/242 |
| 2019/0107048 | A1 * | 4/2019 | Bulat | F02C 3/22 |
| 2019/0356001 | A1 * | 11/2019 | Ramani | H01M 8/04388 |
| 2023/0212990 | A1 * | 7/2023 | Frey | F02C 9/28 |
| | | | | 60/39.281 |
| 2024/0068415 | A1 * | 2/2024 | Frey | F23R 3/36 |
| 2024/0084743 | A1 * | 3/2024 | Suleiman | F02C 7/224 |

OTHER PUBLICATIONS

Meher-Homji et al., Gas Turbine Fuels-System, Design, Combustion, and Operability, Turbomachinery and Pump Symposia, Turbomachinery Laboratories—Texas A&M University, 2010, 155-186. https://doi.org/10.21423/R1GS9Z.

Segers et al., Blending Fuel Gas to Optimize Use of Off-Spec Natural Gas, Environment Science—Engineering, ISA Power Industry Division 54th Annual I&C Symposium, 2011, 13 pages. https://www.ankersmid.com/AutoFiles/doc/6699_Fuel-Gas-Blending-Paper.pdf.

* cited by examiner ns cause the
SYSTEM AND METHOD FOR BLENDING MULTIPLE FUELS

FIELD

The present disclosure relates generally to systems and methods for blending multiple fuels. Particularly, the present disclosure relates to systems and methods for blending two or more fuels for use in a combustion system.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

BRIEF DESCRIPTION

Aspects and advantages of the systems and methods of blending multiple fuels in accordance with the present disclosure will be set forth in part in the following description, or may be obvious from the description, or may be learned through practice of the technology.

In accordance with one embodiment, a method of blending at least two fuels is provided. The method includes providing at least two fuels to a helical static mixer via a fuel supply system, the fuel supply system including a fuel supply circuit for each fuel of the at least two fuels, mixing, via a plurality of helical structures of the helical static mixer, the at least two fuels to form a fuel mixture, determining, via one or more sensors, a measured interchangeability index of the fuel mixture, the interchangeability index being one of a measured Wobbe Index of the fuel mixture or a measured Modified Wobbe Index of the fuel mixture, comparing the measured interchangeability index to a predetermined interchangeability index, adjusting, via the fuel supply system, one or more parameters of at least one of the at least two fuels based on the comparison between the measured interchangeability index and the predetermined interchangeability index, and providing the fuel mixture to a combustion system.

In accordance with another embodiment, a system for blending at least two fuels is provided. The system includes a combustion system, a helical static mixer including a plurality of helical structures, a fuel supply system for supplying at least two fuels to the helical static mixer and the combustion system, the fuel supply system including a fuel supply circuit for each fuel of the at least two fuels, one or more sensors operably connected to the fuel supply system, a controller operably connected to the fuel supply system, the helical static mixer, and the one or more sensors, the controller including the controller including memory and one or more processors, the memory storing instructions that when executed by the one or more processors cause the system to perform one or more operations including providing at least two fuels to the helical static mixer via a fuel supply system mixing, via the plurality of helical structures of the helical static mixer, the at least two fuels to form a fuel mixture, determining, via one or more sensors, a measured interchangeability index of the fuel mixture, the interchangeability index being one of a measured Wobbe Index of the fuel mixture or a measured Modified Wobbe Index of the fuel mixture, comparing the measured interchangeability index to a predetermined interchangeability index, adjusting, via the fuel supply system, one or more parameters of at least one of the at least two fuels based on the comparison between the measured interchangeability index and the predetermined interchangeability index, and providing the fuel mixture to the combustion system.

In accordance with one embodiment, a method of blending at least two fuels is provided. The method includes providing at least two fuels to a mixing chamber via a fuel supply system, the fuel supply system including a fuel supply circuit for each fuel of the at least two fuels, mixing, via baffles of the mixing chamber, the at least two fuels to form a fuel mixture, determining, via one or more sensors, a measured interchangeability index of the fuel mixture, the interchangeability index being one of a measured Wobbe Index of the fuel mixture or a measured Modified Wobbe Index of the fuel mixture, comparing the measured interchangeability index to a predetermined interchangeability index, adjusting, via the fuel supply system, one or more parameters of at least one of the at least two fuels based on the comparison between the measured interchangeability index and the predetermined interchangeability index, and providing the fuel mixture to a combustion system.

In accordance with another embodiment, a system for blending at least two fuels is provided. The system includes a combustion system, a mixing chamber including a plurality of baffles, a fuel supply system for supplying at least two fuels to the mixing chamber and the combustion system, the fuel supply system including a fuel supply circuit for each fuel of the at least two fuels, one or more sensors operably connected to the fuel supply system, a controller operably connected to the fuel supply system, the mixing chamber, and the one or more sensors, the controller including the controller including memory and one or more processors, the memory storing instructions that when executed by the one or more processors cause the system to perform one or more operations including providing at least two fuels to the mixing chamber via a fuel supply system, mixing, via the mixing chamber, the at least two fuels to form a fuel mixture, determining, via one or more sensors, a measured interchangeability index of the fuel mixture, the interchangeability index being one of a measured Wobbe Index of the fuel mixture or a measured Modified Wobbe Index of the fuel mixture, comparing the measured interchangeability index to a predetermined interchangeability index, adjusting, via the fuel supply system, one or more parameters of at least one of the at least two fuels based on the comparison between the measured interchangeability index and the predetermined interchangeability index, and providing the fuel mixture to the combustion system.

In accordance with one embodiment, a method of blending at least two fuels is provided. The method includes providing at least two fuels to an eductor via a fuel supply system, the fuel supply system including a fuel supply circuit for each fuel of the at least two fuels, mixing, via a diffuser of the eductor, the at least two fuels to form a fuel mixture, determining, via one or more sensors, a measured interchangeability index of the fuel mixture, the interchangeability index being one of a measured Wobbe Index of the fuel mixture or a measured Modified Wobbe Index of the fuel mixture, comparing the measured interchangeability index to a predetermined interchangeability index, adjusting, via the fuel supply system, one or more parameters of at least one of the at least two fuels based on the comparison between the measured interchangeability index and the predetermined interchangeability index, and providing the fuel mixture to a combustion system.

In accordance with another embodiment, a system for blending at least two fuels is provided. The system includes a combustion system, an eductor including a motive inlet, a suction inlet, and a diffuser, a fuel supply system for supplying at least two fuels to the eductor and the combustion system, the fuel supply system including a fuel supply circuit for each fuel of the at least two fuels, one or more sensors operably connected to the fuel supply system, a controller operably connected to the fuel supply system, the eductor, and the one or more sensors, the controller including the controller including memory and one or more processors, the memory storing instructions that when executed by the one or more processors cause the system to perform one or more operations including providing at least two fuels to the eductor via a fuel supply system, mixing, via diffuser of the eductor, the at least two fuels from the motive inlet and the suction inlet to form a fuel mixture, determining, via one or more sensors, a measured interchangeability index of the fuel mixture, the interchangeability index being one of a measured Wobbe Index of the fuel mixture or a measured Modified Wobbe Index of the fuel mixture, comparing the measured interchangeability index to a predetermined interchangeability index, adjusting, via the fuel supply system, one or more parameters of at least one of the at least two fuels based on the comparison between the measured Wobbe Index and the predetermined Wobbe Index, and providing the fuel mixture to the combustion system.

In accordance with one embodiment, a method of blending at least two fuels is provided. The method includes providing at least two fuels to a cyclonic mixer via a fuel supply system, the fuel supply system including a fuel supply circuit for each fuel of the at least two fuels, mixing, via at least one vortex formed in the cyclonic mixer, the at least two fuels to form a fuel mixture, determining, via one or more sensors, a measured interchangeability index of the fuel mixture, the interchangeability index being one of a measured Wobbe Index of the fuel mixture or a measured Modified Wobbe Index of the fuel mixture, comparing the measured interchangeability index to a predetermined interchangeability index, adjusting, via the fuel supply system, one or more parameters of at least one of the at least two fuels based on the comparison between the measured interchangeability index and the predetermined interchangeability index, and providing the fuel mixture to a combustion system.

In accordance with another embodiment, a system for blending at least two fuels is provided. The system includes a combustion system, a cyclonic mixer, a fuel supply system for supplying at least two fuels to the cyclonic mixer and the combustion system, the fuel supply system including a fuel supply circuit for each fuel of the at least two fuels, one or more sensors operably connected to the fuel supply system, a controller operably connected to the fuel supply system, the cyclonic mixer, and the one or more sensors, the controller including the controller including memory and one or more processors, the memory storing instructions that when executed by the one or more processors cause the system to perform one or more operations including providing at least two fuels to the cyclonic mixer via a fuel supply system, mixing, via at least one vortex formed in the cyclonic mixer, the at least two fuels to form a fuel mixture, determining, via one or more sensors, a measured interchangeability index of the fuel mixture, the interchangeability index being one of a measured Wobbe Index of the fuel mixture or a measured Modified Wobbe Index of the fuel mixture, comparing the measured interchangeability index to a predetermined interchangeability index, adjusting, via the fuel supply system, one or more parameters of at least one of the at least two fuels based on the comparison between the measured interchangeability index and the predetermined interchangeability index; and providing the fuel mixture to the combustion system.

In accordance with one embodiment, a method of blending at least two fuels is provided. The method includes providing at least two fuels to a first mixing module via a fuel supply system, the fuel supply system including a fuel supply circuit for each fuel of the at least two fuels, mixing, via the first mixing module, the at least two fuels to form an initial fuel mixture, providing the initial fuel mixture to a second mixing module, mixing, via the second mixing module, the initial fuel mixture to form a fuel mixture, determining, via one or more sensors, a measured interchangeability index of the fuel mixture, the interchangeability index being one of a measured Wobbe Index of the fuel mixture or a measured Modified Wobbe Index of the fuel mixture, comparing the measured interchangeability index to a predetermined interchangeability index, adjusting, via the fuel supply system, one or more parameters of at least one of the at least two fuels based on the comparison between the measured interchangeability index and the predetermined interchangeability index, and providing the fuel mixture to a combustion system.

In accordance with another embodiment, a system for blending at least two fuels is provided. The system includes a combustion system, a first mixing module, a second mixing module, a fuel supply system for supplying at least two fuels to the first mixing module, the second mixing module, and the combustion system, the fuel supply system including a fuel supply circuit for each fuel of the at least two fuels, one or more sensors operably connected to the fuel supply system, a controller operably connected to the fuel supply system, the first mixing module, the second mixing module, and the one or more sensors, the controller including the controller including memory and one or more processors, the memory storing instructions that when executed by the one or more processors cause the system to perform one or more operations including providing at least two fuels to the first mixing module via a fuel supply system, mixing, via the first mixing module, the at least two fuels to form an initial fuel mixture, providing the initial fuel mixture to a second mixing module, mixing, via the second mixing module, the fuel mixture to form a fuel mixture, determining, via one or more sensors, a measured interchangeability index of the fuel mixture, the interchangeability index being one of a measured Wobbe Index of the fuel mixture or a measured Modified Wobbe Index of the fuel mixture, comparing the measured interchangeability index to a predetermined interchangeability index, adjusting, via the fuel supply system, one or more parameters of at least one of the at least two fuels based on the comparison between the measured interchangeability index and the predetermined interchangeability index, and providing the fuel mixture to the combustion system.

These and other features, aspects and advantages of the present systems and methods of blending two or more fuels will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present systems and methods of blending multiple fuels, including the best mode of making and using the present systems and methods, directed to one of ordinary skill in the art, is set forth in the specification, which makes reference to the appended figures, in which.

DETAILED DESCRIPTION

Figure 1:
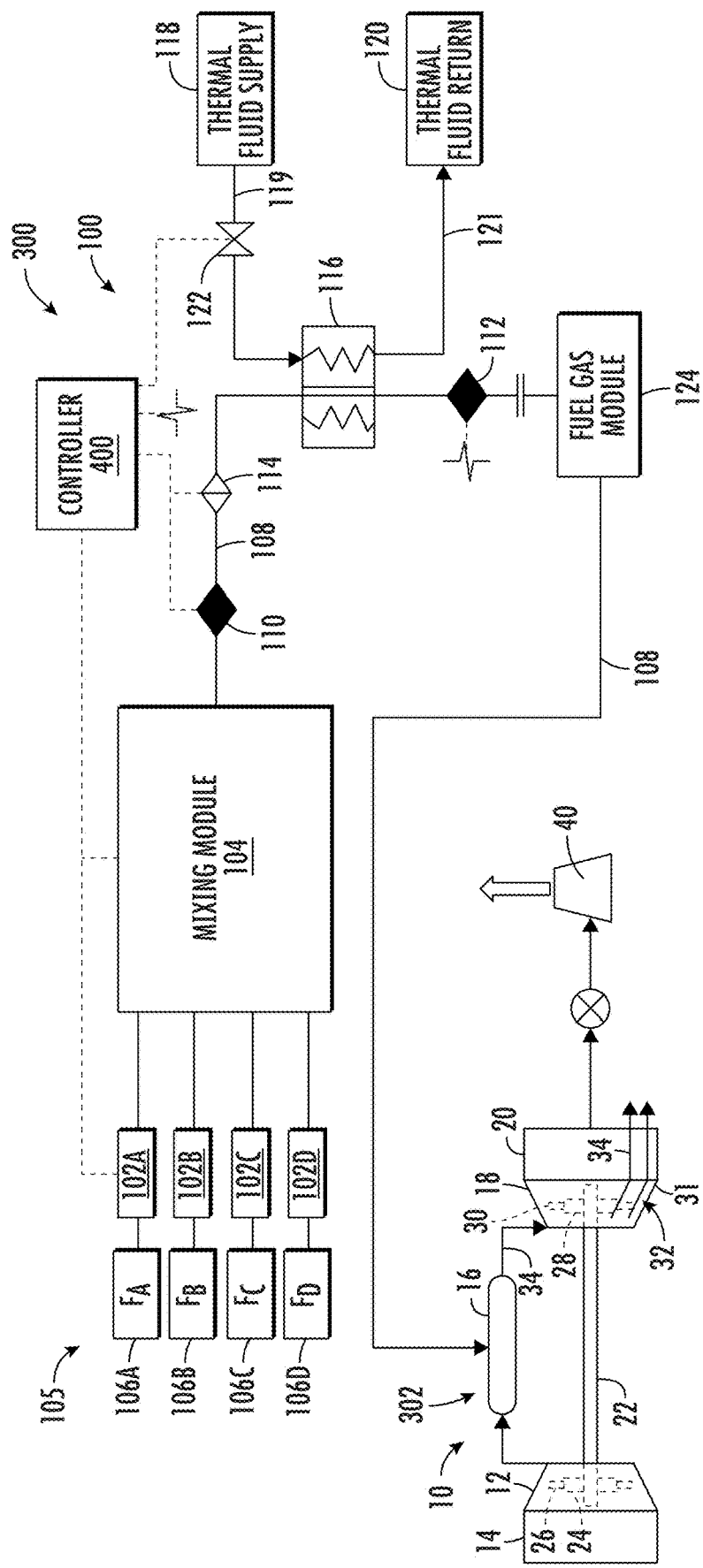
FIG. 1 is a schematic illustration of a system in accordance with embodiments of the present disclosure.

Reference now will be made in detail to embodiments of the present systems and methods of blending multiple fuels, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein the "heating value" of a fuel is an upper limit of the available thermal energy produced by complete combustion of the fuel, measured as a unit of energy per unit mass or volume. A "higher heating value" is a total amount of thermal energy produced including the energy used to vaporize water produced during the combustion reactions (also referred to as a "gross heating value"), and a "lower heating value" is a total amount of thermal energy produced excluding the energy used to vaporize water produced during the combustion reactions (also referred to as a "net heating value").

The "specific gravity" of a fuel is a ratio of the density of the fuel to the density of air at standard temperature and pressure conditions (273.15 Kelvin, 10,000 Pascals).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "line" may refer to a pipe, hose, tube, or other fluid carrying conduit.

In this context, two components are in "series" when the two components are arranged in a successive manner, such as a second component being located downstream from a first component to receive a fluid from the first component. Two components are in "parallel" when the two components are arranged at a same location to receive a fluid from a common source, and do not share the fluid between them.

Referring now to the drawings, FIG. 1 illustrates a schematic diagram of one embodiment of a system 300 for blending at least two fuels 105, which may subsequently be provided to a combustion system 302. The system 300 may include a combustion system 302 and a fuel supply system 100 fluidly connected to the combustion system 302. In the illustrated embodiment, the combustion system 302 is a combustion section of a gas turbine 10. However, in other embodiments, the combustion system 302 may be an internal combustion engine, a jet engine, an aircraft engine, a burner, dry low NOx combustors, or other combustion systems. Additionally, while an industrial or land-based gas turbine is shown and described herein, the present disclosure is not limited to a land based and/or industrial gas turbine unless otherwise specified in the claims. For example, the invention as described herein may be used in any type of turbomachine including but not limited to an aircraft gas turbine or a marine gas turbine.

As shown, the gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 44 extending radially outwardly from and connected to each rotor disk 24. Each rotor disk 24 in turn may be coupled to or form a portion of the shaft 22 that extends through the compressor section 14. The compressor section 14 may further include one or more stator vanes 50 arranged circumferentially around the shaft 22. The stator vanes 27 may be fixed to a compressor casing or static casing 48 that extends circumferentially around the rotor blades 44.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18.

During operation, a working fluid such as air flows through the inlet section 12 and into the compressor section 14 where the air is progressively compressed, thus providing pressurized air to the combustors of the combustor section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20. The exhaust gases may be provided to an exhaust stack 40, which may exhaust the gases to the atmosphere.

The fuel supply system 100 may supply or provide the at least two fuels 105 to a mixing module 104 (and subsequently to the gas turbine 10). For example, the fuel supply system 100 may include a first fuel supply 106A (for supplying a first fuel FA), a second fuel supply 106B (for supplying a second fuel FB), a third fuel supply 106C (for supplying a third fuel Fc), and a fourth fuel supply 106D (for supplying a fourth fuel FD). Each fuel of the at least two fuels 105 may be different from one another (i.e., having a different chemical composition). The fuels may include (but are not limited to) natural gas, ammonia, hydrogen, or other fuels. Additionally, the fuel supply system 100 may supply other fluids, such as exhaust gas from an exhaust gas recirculation (EGR) system (not shown). While the embodiment shown in FIG. 1 includes four fuels, the fuel supply system 100 should not be limited to any particular number of fuels unless specifically recited in the claims. In other embodiments, the fuel supply system may include any number of fuels.

In exemplary embodiments, the fuel supply system 100 may include multiple fuel supply circuits 102A, 102B, 102C, 102D for separately providing each fuel of the at least two fuels 105 to the mixing module 104. As discussed below in more detail, each of the fuel supply circuits 102A, 102B, 102C, 102D may have the same or similar construction.

The mixing module 104 may be fluidly coupled to each of the fuel supply circuits 102A, 102B, 102C, 102D. The mixing module 104 may blend together the at least two fuels 105 to produce a homogeneous fuel mixture. The homogeneous fuel mixture may be provided to the combustion system 302 via an outlet line 108. The outlet line 108 may extend from the mixing module 104 to the combustion system 302, e.g., to the combustion section 16 of the gas turbine 10.

In various embodiments, as shown in FIG. 1, one or more sensors may be operably connected to the fuel supply system 100. The one or more sensors may include a first Wobbe Index sensor 110, a second Wobbe Index sensor 112, and a flow rate sensor 114. The Wobbe Index sensors 110, 112 may be configured to sense data indicative of a Wobbe Index of the fuel mixture (i.e., a measured Wobbe Index). As should be appreciated, the Wobbe Index is a measure used to assess the interchangeability of different fuels (or fuel mixtures), i.e., an "interchangeability index". The Wobbe Index (WI) is calculated as follows:

$$WI = \frac{LHV}{\sqrt{SG}} \qquad (1)$$

where LHV is the lower heating value of the fuel and SG is the specific gravity of the fuel. The Wobbe Index helps determine if a first fuel (or first fuel mixture) may be substituted for a second fuel (or second fuel mixture). The flow rate sensor 114 may be configured to sense data indicative of a flow rate of the fuel mixture within the outlet line 108.

Additionally or alternatively, the Wobbe Index sensors 110, 112 may be configured to sense data indicative of a Modified Wobbe Index (MWI) of the fuel mixture:

$$MWI = \frac{LHV}{\sqrt{T_g \cdot SG}} \qquad (2)$$

where $T_g$ is the temperature of the fuel. The Modified Wobbe Index is another metric that helps determine if a first fuel (or first fuel mixture) may be substituted for a second fuel (or second fuel mixture). That is, the interchangeability index may be the Wobbe Index or the Modified Wobbe Index.

The system 300 may further include a controller 400 operably connected to operably connected to the one or more sensors to receive data from the sensors and determine various operational parameters of the system 300. Particularly, the controller 400 may be operably connected to the fuel supply system 100 (including each component on the fuel supply circuits 102A, 102B, 102C, 102D), the mixing module 104, and the one or more sensors 110, 112, 114. As discussed in more detail with reference to FIG. 14, the controller 400 may include memory and one or more processors. The memory may instructions that when executed by the one or more processors cause the system 300 to perform one or more operations, which may include: providing the at least two fuels 105 to the mixing module 104, mixing the at least two fuels with the mixing module 104, determining via the Wobbe Index sensors 110, 112, a measured interchangeability index of the fuel mixture, comparing the measured interchangeability index to a predetermined interchangeability index, adjusting one or more parameters of at least one of the at least two fuels 105, and providing the fuel mixture to the combustion system 302.

For example, based on the comparison between the measured interchangeability index and the predetermined interchangeability index, the controller 400 may instruct the system 300 to adjust an amount, a temperature, a pressure, or a flow rate of each fuel of the at least two fuels provided to the mixing module 104 (thereby adjusting the fuel mixture) in order to drive the measured interchangeability index towards the predetermined interchangeability index. The predetermined interchangeability index being selected based one or more factors for improving operation of the gas turbine engine, such as efficiency requirements of the gas turbine 10, combustion dynamics including resonant acoustic pressure pulses, and the like. For example, a fuel mixture having a interchangeability index equal to the predetermined interchangeability index may be the fuel mixture that results in the highest efficiency operation of the gas turbine 10 when compared to other fuel mixtures.

As shown in FIG. 1, the system 300 may further include a heat exchanger 116 disposed in thermal communication on the outlet line 108 downstream of the first Wobbe Index sensor 110 and the flow rate sensor 114 and upstream of the second Wobbe Index sensor 112 with respect to the flow of the fuel mixture through the outlet line 108. The heat exchanger 116 may adjust a temperature of the fuel mixture within the outlet line 108 by transferring heat between a thermal fluid and the fuel mixture. For example, the heat exchanger 116 may be fluidly coupled to a thermal fluid supply 118 via an inlet line 119 and a thermal fluid return 120 via an outlet line 121. Additionally, a valve 122 may be disposed in fluid communication on the inlet line 119. The valve 122 may be in operable communication with the controller 400 and actuatable between an open position (in which flow is permitted) and a closed position (in which flow is restricted or entirely prevented). Based on the comparison between the measured interchangeability index and the predetermined interchangeability index, the controller may adjust a position of the valve 122, thereby adjusting the heat transfer rate between the thermal fluid and the fuel mixture, which in turn adjusts the temperature of the fuel mixture to drive the measured interchangeability index towards the predetermined interchangeability index.

In various embodiments, the fuel supply system 100 may further include a gas fuel module 124. The gas fuel module 124 may include one or more pumps, pressure regulators, valves, manifolds, and/or fluid conduits for supplying the fuel mixture to the combustion section 16 of the gas turbine 10. The gas fuel module 124 may be disposed on the outlet line 108 downstream of the second Wobbe Index sensor and the heat exchanger 116 and upstream (e.g., directly upstream) of the combustion section 16.

Referring now to FIGS. 2 through 12, a fuel supply system 100 (which includes a fuel supply circuit 102) and various embodiments of a mixing module 104 are illustrated. Particularly, FIGS. 2 through 12 illustrate the details of the first fuel supply circuit 102A, which may be implemented in the other fuel supply circuits 102B, 102C, 102D as well. For example, while the details of the first fuel supply circuit 102A are illustrated in the FIGS., it should be appreciated that each of the other fuel supply circuits 102B, 102C, 102D may have the same or similar construction as the first fuel supply circuit 102A.

As shown, the fuel supply circuits 102A, 102B, 102C, 102D may each include a main fuel supply line 126A, 126B, 126C, 126D extending from the respective fuel supplies 106A, 106B, 106C, 106D to the mixing module 104. As shown, the fuel supply circuit 102 may include an electric heater 128 that is disposed in thermal communication on the main fuel supply line 126A immediately downstream of the first fuel supply 106A. The electric heater 128 may modify a temperature of the first fuel FA within the main fuel supply line 126A. The electric heater 128 may be electrically connected to a power supply 130.

In many embodiments, a recirculation line 132 may extend from an inlet 134 on the main fuel supply line 126 to an outlet 136 on the main fuel supply line 126. The outlet 136 may be upstream of the inlet 134 with respect to the flow of fuel through the main fuel supply line 126. The recirculation line 132 may be disposed downstream of the electric heater 128. In many embodiments, a control valve 138 may be disposed in fluid communication on the main fuel supply line 126 between the inlet 134 and the outlet 136 of the recirculation line 132.

The fuel supply circuit 102 may include an atmospheric vent line 140 that extends from the main fuel supply line 126. The atmospheric vent line 140 may vent fuel from the fuel supply line 126A for maintenance activities. For example, if maintenance is necessary on one or more components of the fuel supply system 100, the vent line 140 may clear the main fuel supply line 126 of any remaining fuel so the maintenance activities may be done safely. In various embodiments, a control valve 142 may be disposed in fluid communication on the vent line 140.

The fuel supply circuit 102 may further include a control valve 144 downstream of the inlet 134 to the recirculation line 132. The control valves 138, 142, 144 may control an amount of fuel permitted to flow through the main fuel supply line 126, thereby controlling an amount of fuel recirculated through the recirculation line 132. Each of the control valves 138, 142, 144 may be modulated (e.g., by the controller 400) between a fully open (e.g., 100% open), partially open (e.g. between 0% open and 100% open), and fully closed (e.g., 0% open) position. By modulating the control valves 138, 142, 144, the desired amount, and flow rate, of the first fuel FA through the fuel supply circuit 102 may be achieved.

One or more sensors 146 may be disposed on the main fuel supply line 126A for sensing data indicative of one or more parameters of the first fuel FA. The one or more sensors 146 may include a flow rate sensor 148 configured to sense data indicative of a flow rate of the first fuel through the main fuel supply line 126A. The controller 400 may modulate one or more of the valves 138, 142, 144 based on the data indicative of the flow rate from the flow rate sensor 146. Additionally, the one or more sensors 146 may include a third Wobbe Index sensor 150, which may be configured to sense data indicative of a interchangeability index of the first fuel FA. Furthermore, the one or more sensors 146 may include a pressure sensor 152, which may sense data indicative of a pressure of the first fuel FA.

Each sensor of the one or more sensors 146 may be operatively connected to the controller 400. Based on the data provided by the one or more sensors 146 (e.g., the data indicative of a flow rate, the data indicative of a interchangeability index, and/or the data indicative of a pressure), the controller may modulate one or more of the control valves 138, 142, 144 to adjust a flow rate of the first fuel FA. Additionally, based on the data provided by the one or more sensors 146, the controller 400 may adjust an operation of the electric heater 128 to modify (e.g., increase or decrease) the temperature of the first fuel FA.

The fuel supply circuit 102 may further include a safety shut off valve (SSOV) 154. The SSOV 154 may prevent an influx of fuel from the fuel supply in the event one or more of the control valves 138, 142, 144 fails. For example, if the controller 400 determines a rapid increase in the flow rate based on data provided by the flow rate sensor 148, the SSOV 154 may engage and prevent the fuel from being provided to the mixing module 104. Additionally, the fuel supply circuit 102 may include a first master control valve (MCV) 156 and a second MCV 158, which may be provided as an added safety measure because the fuels provided to the mixing chamber are often at very high pressures and to measure and control fuel volumes. The first MCV 156 may be a stop ratio valve, and the second MCV 158 may be a gas control valve. The first and second MCVs 156, 158 may be motorized valves.

Each fuel 105 of the at least two fuels 105 may be provided to a mixing module 104, which may be different in each of the illustrated embodiments. The at least two fuels 105 may be mixed or blended together within the mixing module 104 to produce a fuel mixture 166, which may be provided to the combustion system 302 (FIG. 1) via the outlet line 108.

Figure 2:
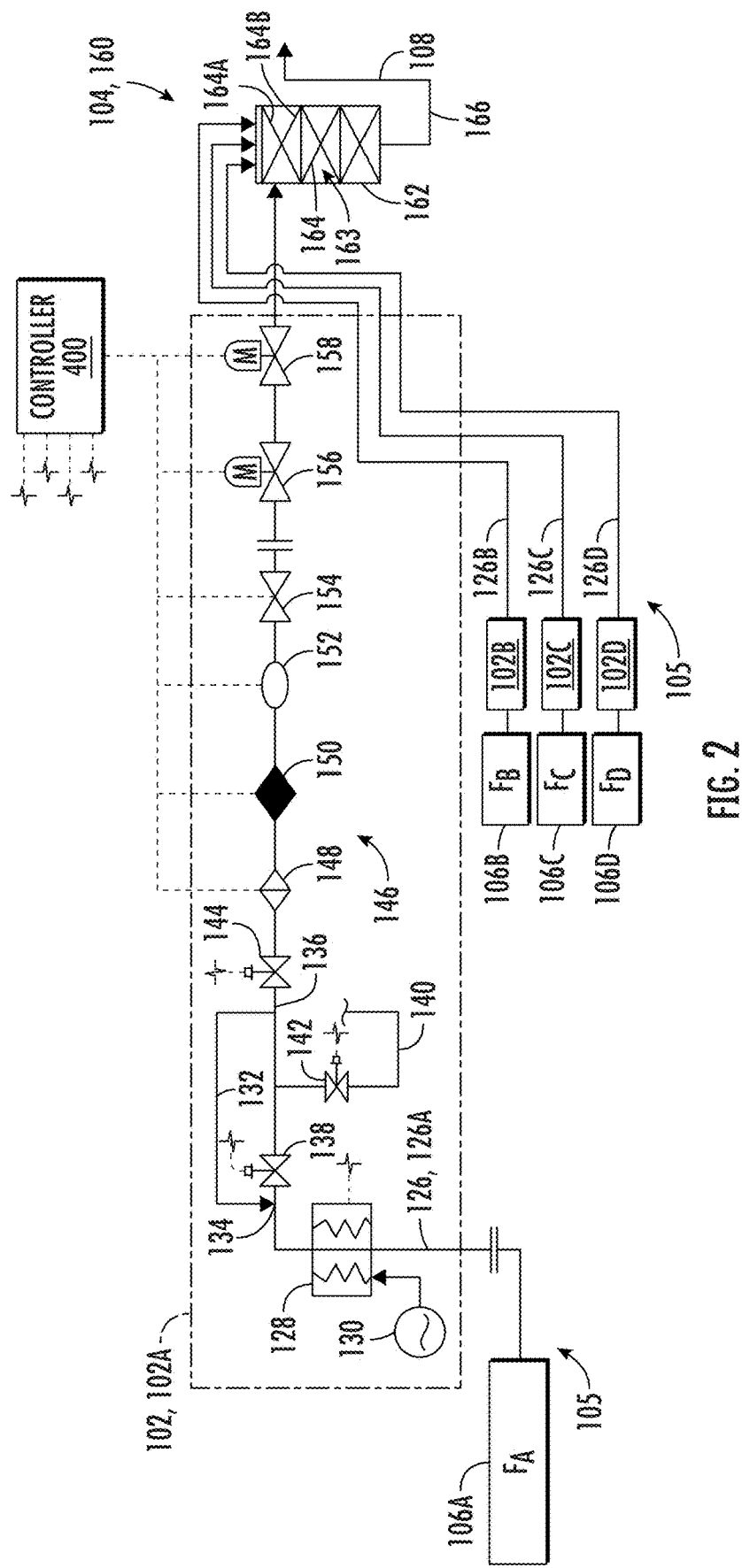
FIG. 2 illustrates a diagram of a fuel supply system and a mixing module for blending multiple fuels in accordance with embodiments of the present disclosure.

As shown in FIG. 2, in some embodiments, the mixing module 104 may be a helical static mixer 160. The helical static mixer 160 may include a housing 162 that defines a chamber 163 and helical structures 164 disposed within the chamber 163. The helical structures 164 may be fins, twisted blades, turbulators, baffles, vanes or other structures within the chamber to promote mixing of the at least two fuels into the fuel mixture 166. The helical structures 164 of FIG. 2 are a plurality of helical vanes that are arranged to cause changes in the flow of the fuels 105. More specifically, a first helical vane 164A may cause the flow of the fuels to rotate in a first direction, and an adjacent helical vane 164B may change the direction of flow to a second direction that is different than the first direction. In particular, the second direction may be an opposite or reverse direction from the first direction, and the fuels 105 may be bounced between the first and second directions in a forward-backward motion, which increases mixing of the fuels 105. Additionally, the helical vanes 164 allow the fuels 105 to move radially from a center of the helical static mixer 160 to an outer edge of the helical static mixer 160, further increasing mixing between the fuels 105.

Figure 3:
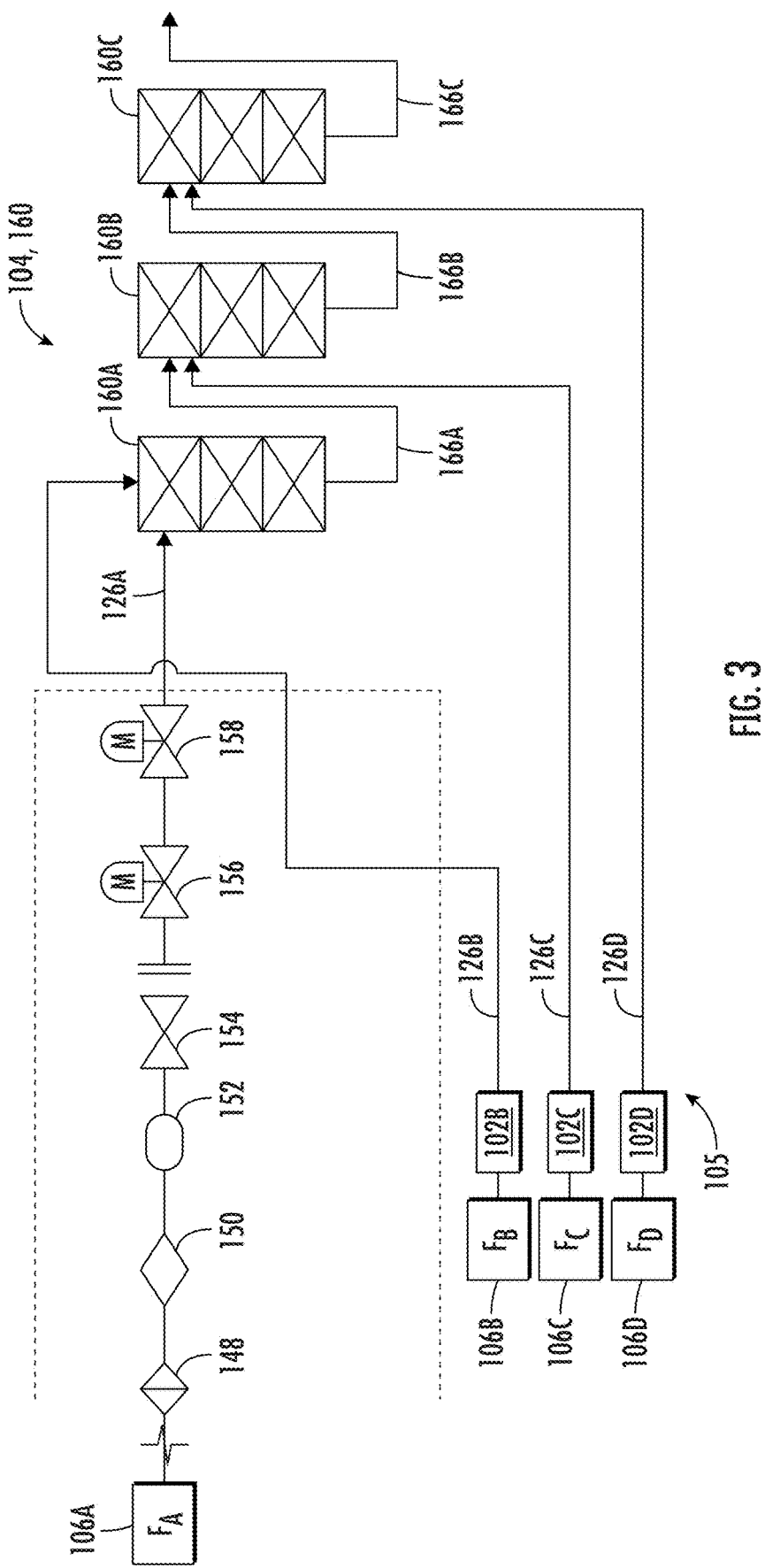
FIG. 3 illustrates a diagram of a fuel supply system with a plurality of mixing modules.

Now referring to FIG. 3, the fuel supply system 100 may include a plurality of helical static mixers 160. FIG. 3 shows three helical static mixers 160, including a first helical static mixer 160A, a second helical static mixer 160B, and a third helical static mixer 160C (collectively, "helical static mixers 160") arranged in series, such that the fuels 105 flow sequentially from the first helical static mixer 160A to the second helical static mixer 160B and then to the third helical static mixer 160C. By arranging the helical static mixers 160 in series, each of the helical static mixers may further mix the fuels such that, once the fuel mixture 166 exits the third helical static mixer 160C, the fuel mixture 166 is homogenous.

FIG. 3 shows the fuels FA, FB, Fc, FD provided the helical static mixers 160A at different points to form the fuel mixture 166. Specifically, two fuels FA, FB fuels FA, FB may be supplied to the first helical static mixer 160A to form a first fuel mixture 166A, then the fuel FC may be supplied to the second helical static mixer 160B with the first fuel mixture 166A to form a second fuel mixture 166B, and then the fuel FD may be supplied to the third helical static mixer 160C with the second fuel mixture 166B to form the fuel mixture 166. It will be appreciated that other combinations of fuels 105 may be provided to different ones of the helical static mixers 160 to provide a suitable fuel mixture 166.

Alternatively, not shown in FIG. 3, two or more of the helical static mixers 160 may be arranged in parallel, rather than in series, and a final helical static mixer 160 may be in fluid communication with the parallel helical static mixers 160 to form the fuel mixture 166. In such a form, some of the fuels 105 may be supplied to the parallel helical static mixers 160 to form initial fuel mixtures, and the final helical static mixer 160 may mix the initial fuel mixtures into the fuel mixture 166. Such an arrangement allows fuels 105 that mix well together to be mixed into the initial fuel mixtures, improving the overall mixing of the fuels 105 to form the fuel mixture 166 in the final helical static mixer 160.

Figure 4:
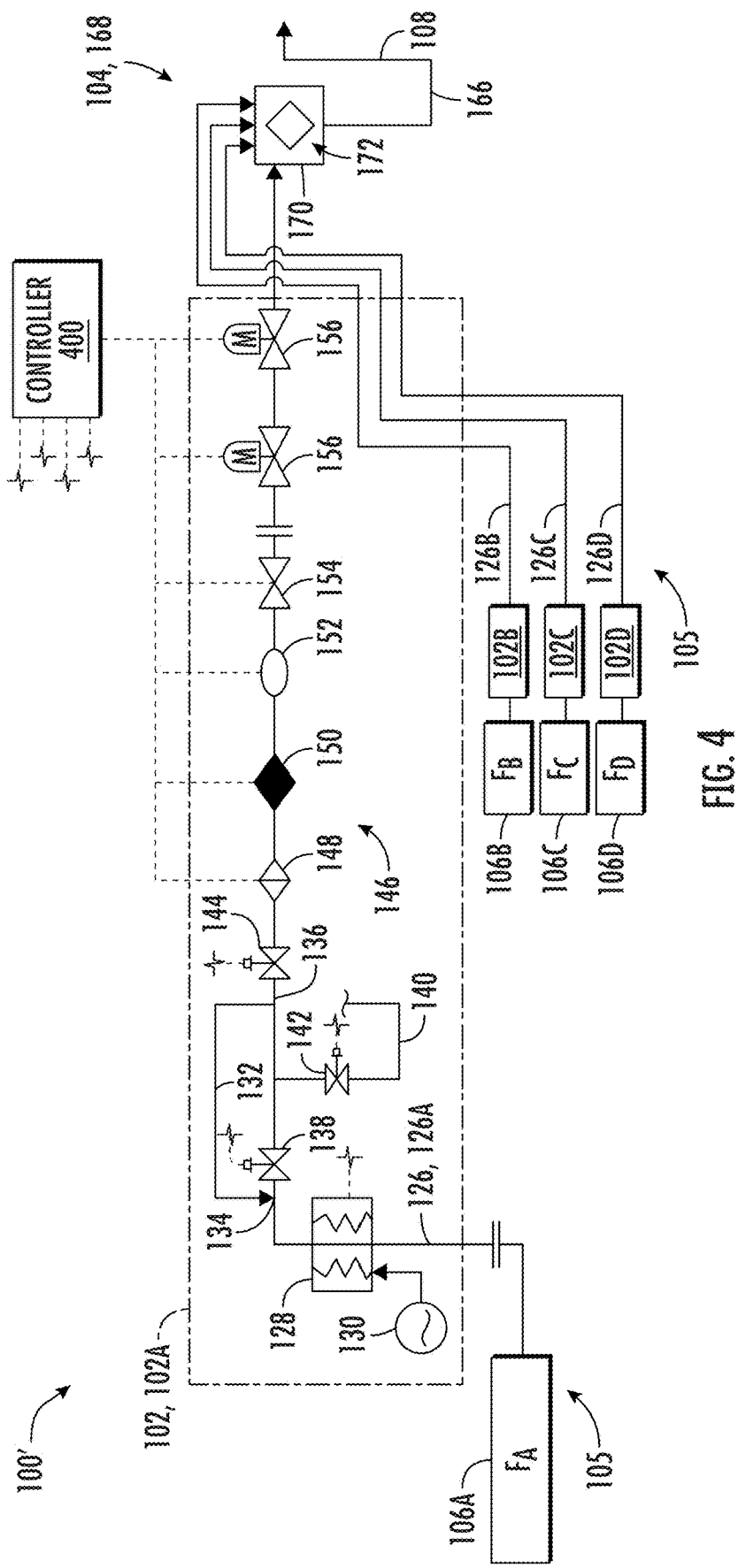
FIG. 4 illustrates a diagram of a fuel supply system and a mixing module for blending multiple fuels in accordance with embodiments of the present disclosure.
Figure 5:
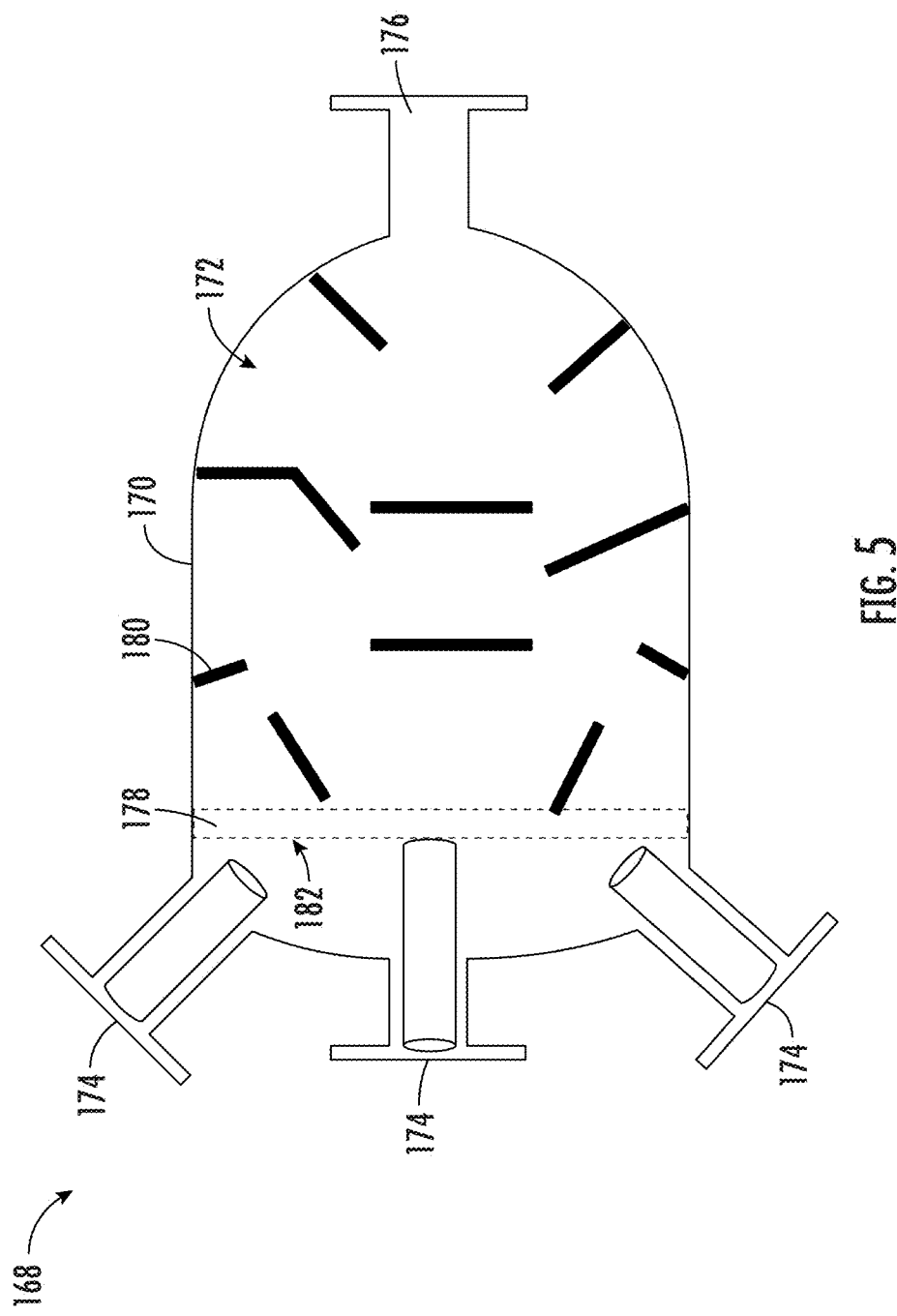
FIG. 5 illustrates a magnified view of a mixing module.
Figure 6:
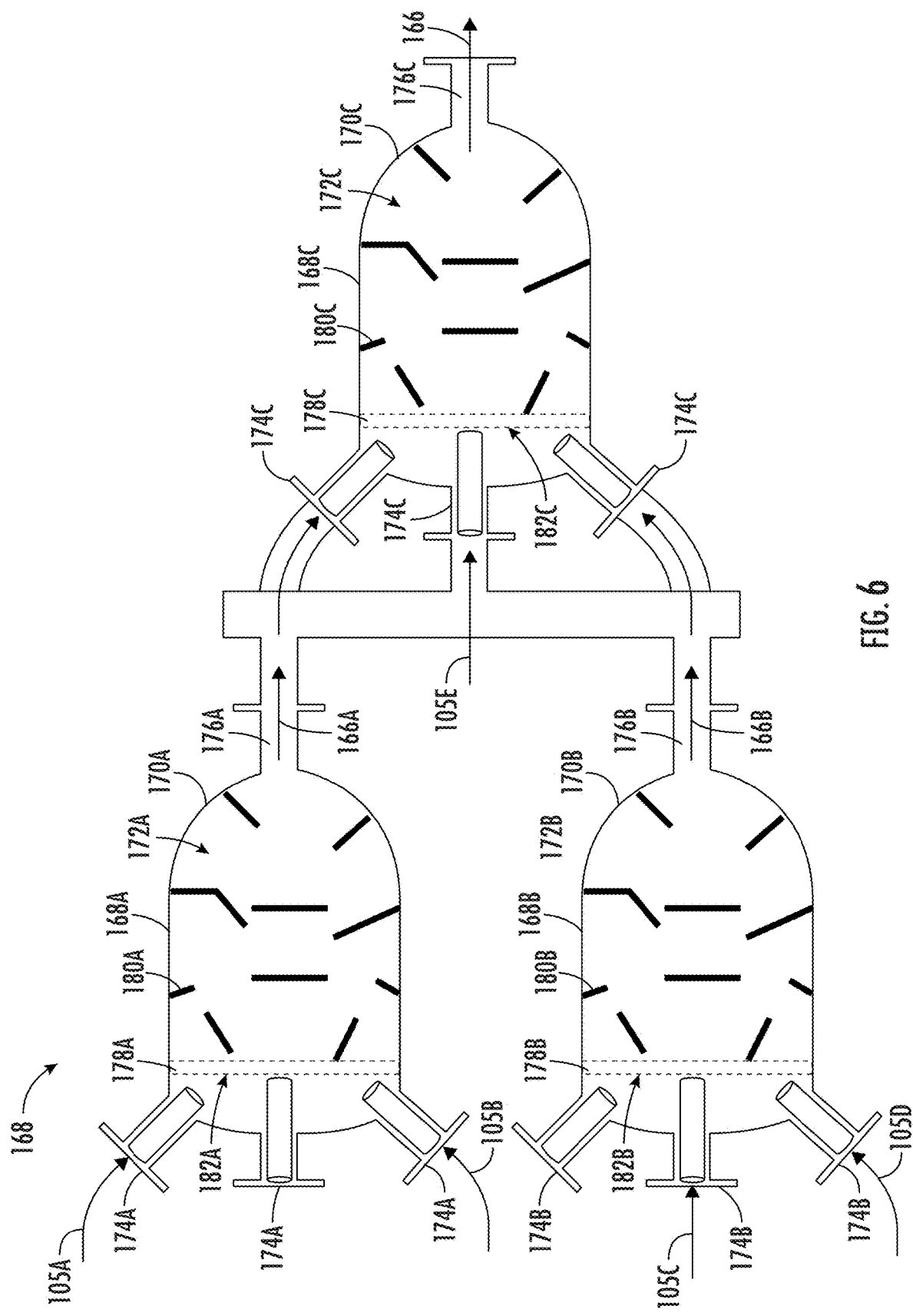
FIG. 6 illustrates a plurality of mixing modules.

Now referring to FIGS. 4-6, a fuel supply system 100' is shown. In the fuel supply system 100', the mixing module 104 is a mixing chamber 168. Specifically, FIG. 4 shows the fuel supply system 100' with the mixing chamber 168, FIG. 5 is a magnified view of the mixing chamber 168, and FIG. 6 shows a plurality of mixing chambers 168 arranged in a parallel configuration to form the fuel mixture 166.

As shown in FIG. 4, the mixing chamber 168 may include a vessel or housing 170 that defines a chamber 172. Two or more of the fuels FA, FB, Fc, FD may be provided to the chamber 172, in which the fuels 105 mix together to form the fuel mixture 166. The fuel mixture 166 is then provided to the combustion system (FIG. 1) via the outlet line 108.

Now referring to FIG. 5, the housing 170 includes a plurality of inlets 174 and an outlet 176, and an effusion plate 178 and a plurality of baffles 180 are disposed in the chamber 172 to mix the fuels 105. Specifically, one or more of the main fuel supply lines 126A, 126B, 126C, 126D may be in fluid communication with one of the plurality of inlets 174 to provide one of the fuels 105 to the mixing chamber 168. The plurality of inlets 174 provide the fuels 105 to the effusion plate 178, which includes a plurality of apertures 182 through which the fuels 105 are forced, forming individual streams of the fuels 105 that enter the chamber 172. The fuels 105 then reach the baffles 180, which cause the individual streams to bounce in different directions, mixing the streams together. By forcing the fuels 105 in different directions, the baffles 180 cause the flows of the fuels 105 to merge with each other, eventually forming a homogenous fuel mixture 166 that exits the outlet 176.

Now referring to FIG. 6, three mixing chambers 168A, 168B, 168C (collectively, "mixing chambers 168") are shown. It will be appreciated that common parts will carry the suffix corresponding to their respective mixing chamber; i.e., a first mixing chamber 168A includes a first housing 170A, a first chamber 172A, first inlets 174A, a first outlet 176A, a first effusion plate 178A, first baffles 180A, and first apertures 182A for the first effusion plate 178A. A second mixing chamber 168B has similar parts with the suffix "-B," and a third mixing chamber 168C has similar part with the suffix "-C."

The mixing chambers 168 are arranged in a parallel configuration. Specifically, the first mixing chamber 168A and the second mixing chamber 168B are arranged such that fuels 105 enter their respective inlets 174A independent from each other. In the example of FIG. 6, a first fuel 105A and a second fuel 105B are provided to the first inlets 174A of the first mixing chamber 168A, and a third fuel 105C and a fourth fuel 105D are provided to the second inlets 174B of the second mixing chamber 168B. Upon mixing, a first fuel mixture 166A from the first outlet 176A of the first mixing chamber 168A and a second fuel mixture 166B from the second outlet 176B of the second mixing chamber 168B are provided to third inlets 174C of the third mixing chamber 168C. A fifth fuel 105E may be introduces to another of the third inlets 174C. The third mixing chamber 168C mixes the first and second fuel mixtures 166A, 166B (and, optionally, the fifth fuel 105E), to form a homogenous fuel mixture 166. It will be appreciated that the mixing chambers 168 may alternatively be arranged in a series configuration, not shown in the FIGS.

Figure 7:
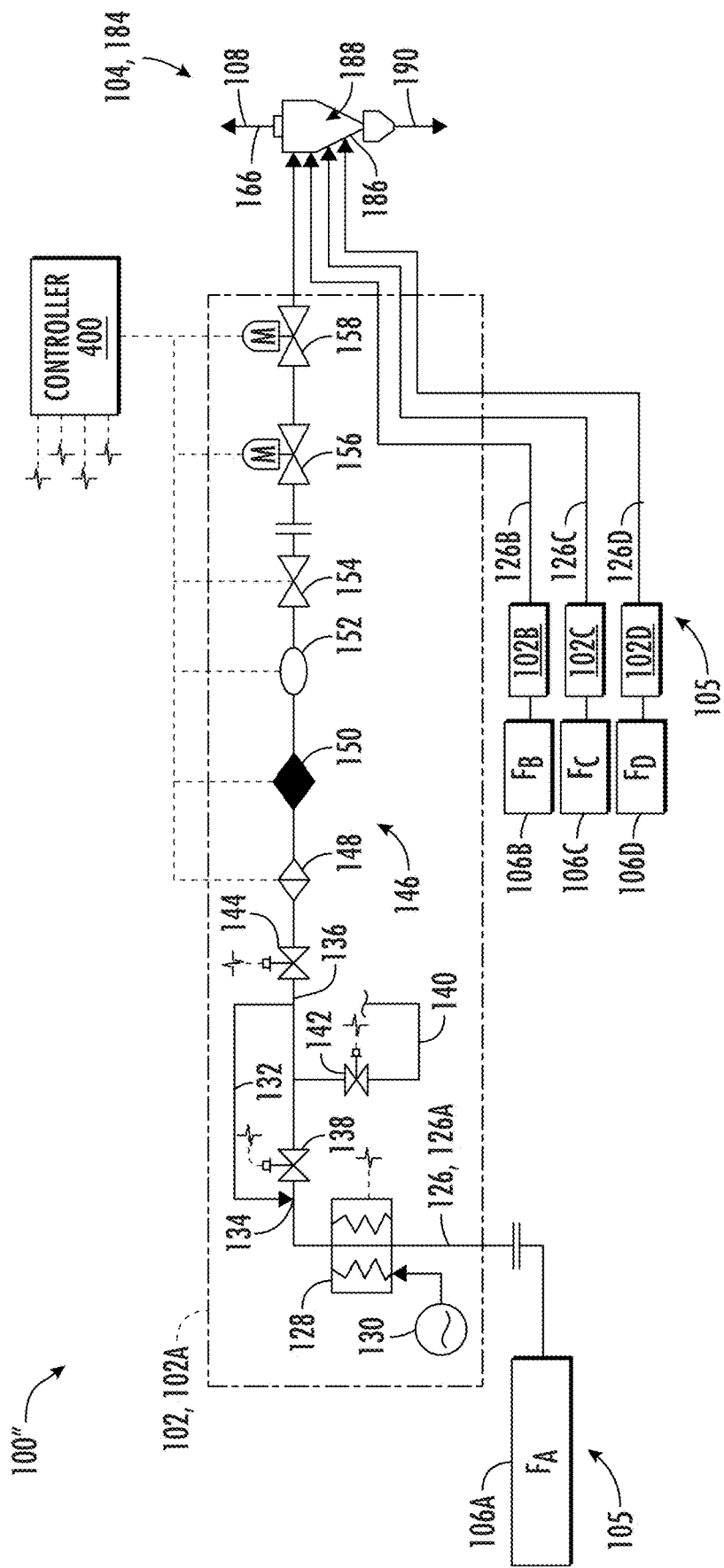
FIG. 7 illustrates a diagram of a fuel supply system and a mixing module for blending multiple fuels in accordance with embodiments of the present disclosure.
Figure 8:
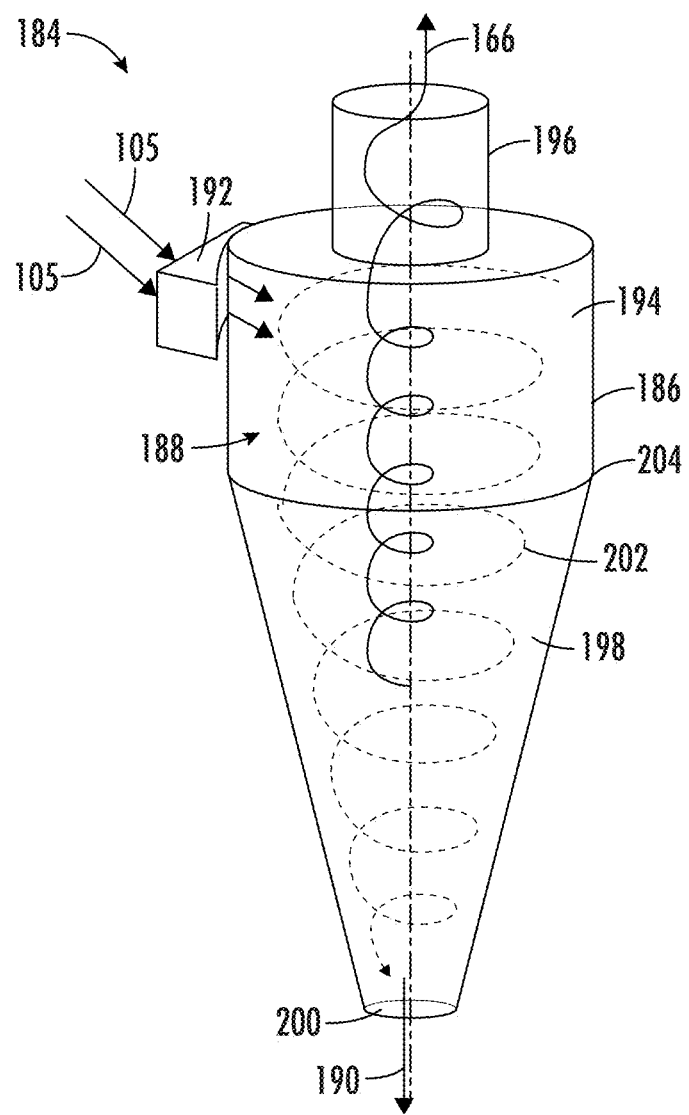
FIG. 8 illustrates a magnified view of a mixing module.
Figure 9:
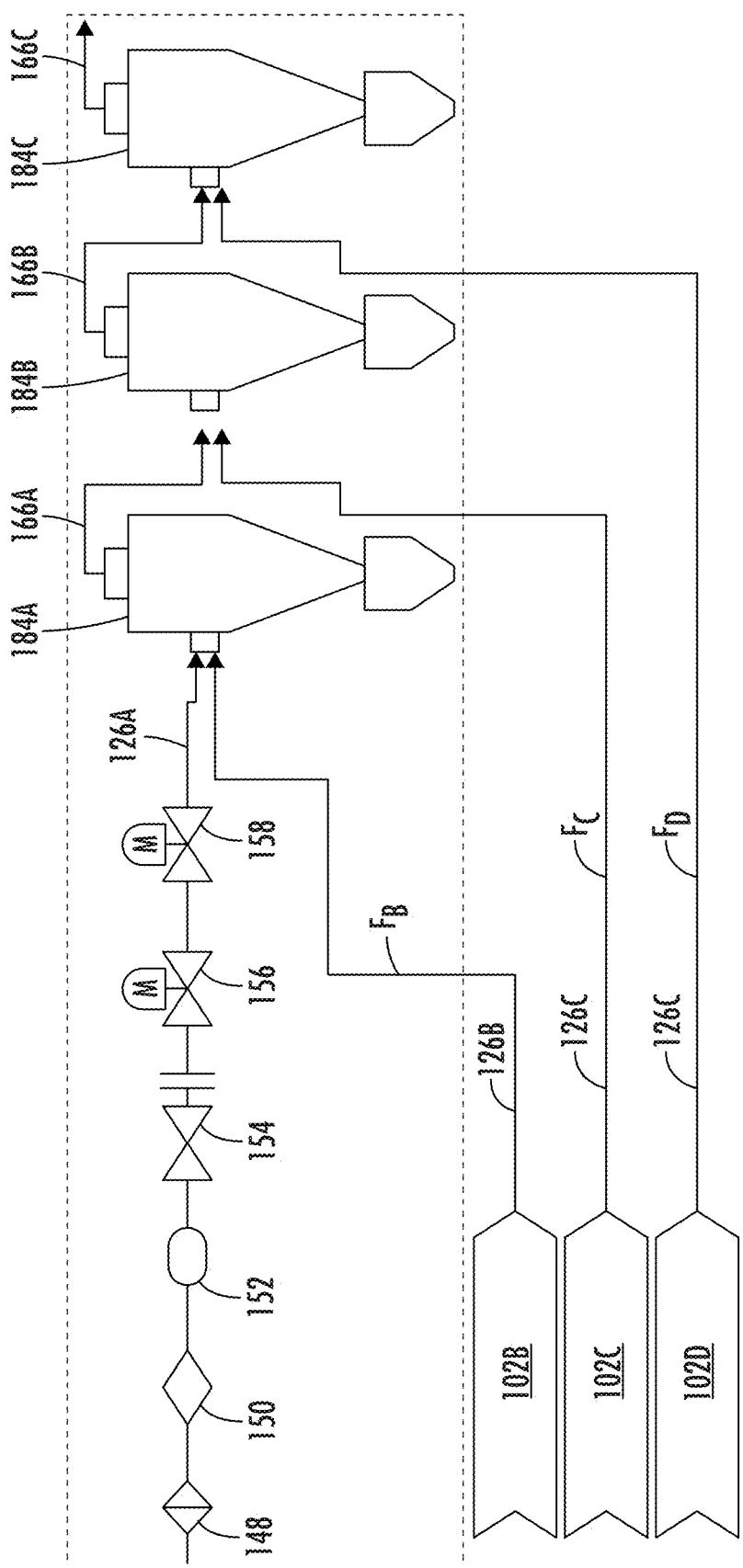
FIG. 9 illustrates a diagram of a fuel supply system with a plurality of mixing modules.

As shown in FIGS. 7-9, a fuel supply system 100" shows the mixing module 104 as a solid particle gas separator and cyclonic mixer, referred to herein as "cyclonic mixer" 184. With reference to FIG. 7, the cyclonic mixer 184 may include a housing 186 that defines a chamber 188 into which each of the fuels $F_A$, $F_B$, $F_C$, $F_D$ may be provided. A swirler (not shown) that rotates may be provided within the chamber 188 to cause the fuels $F_A$, $F_B$, $F_C$, $F_D$ to swirl within the chamber 188. The centrifugal force created by the swirler may cause the solid particles 190 to separate from the fuels $F_A$, $F_B$, $F_C$, $F_D$ while simultaneously mixing the fuels $F_A$, $F_B$, $F_C$, $F_D$ to form the fuel mixture 166. For example, solid particles 190 may fall to the bottom of the cyclonic 184 (e.g., via gravity), and the fuel mixture 166 may be provided from the top of the cyclonic mixer 184.

Now referring to FIG. 8, a magnified view of the cyclonic mixer 184 is shown. The housing 186 includes an inlet 192, a barrel portion 194, a gas outlet 196 extending from the barrel portion 194, a cone portion 198, and a particle outlet 200 extending from the cone portion 198. The barrel portion 194 and the cone portion 198 define the chamber 188 in which the fuels 105 swirl. More specifically, the barrel portion 194 is cylindrical, and when the fuels 105 enter through the inlet 192, the cylindrical shape of the barrel portion 194 causes the fuels 105 to flow into an outer vortex 202. The outer vortex 202 drives the solid particles 190 to an outer edge of the barrel portion 194, and the remaining fuels 105 travels inward to form an inner vortex 204. The solid particles 190 descend via gravity to the particle outlet 200, and the inner vortex 204 flows upward through the gas outlet 196, forming the fuel mixture 166. The interaction between the inner vortex 204 and the outer vortex 202 causes the fuels 105 to mix, such that the fuel mixture 166 exiting the gas outlet 196 is more mixed than the fuels 105 entering through the inlet 192. In particular, the fuel mixture 166 exiting the gas outlet 196 may be homogenous.

Now referring to FIG. 9, a plurality of cyclonic mixers 184 may mix a plurality of fuels $F_A$, $F_B$, $F_C$, $F_D$ into the fuel mixture 166. FIG. 9 shows a first cyclonic mixer 184A, a second cyclonic mixer 184B, and a third cyclonic mixer 184C, collectively, "cyclonic mixers 184." The first cyclonic mixer 184A may mix two or more of the fuels 105 (such as the fuels $F_A$, $F_B$) into a first fuel mixture 166A that is provided to the second cyclonic mixer 184B. The second cyclonic mixer 184B may mix the first fuel mixture 166A with another one or more of the fuels 105 (such as the fuel Fc) to form a second fuel mixture 166B that is provided to the third cyclonic mixer 184C. The third cyclonic mixer 184C may mix the second fuel mixture 166B with one or more of the fuels 105 (such as the fuel $F_D$) to form the homogeneous fuel mixture 166. It will be appreciated that the fuel supply system 100 may include a different number of cyclonic mixers 184 to form the homogeneous fuel mixture 166 with a different number of fuels 105.

The plurality of cyclonic mixers 184 may be arranged in series, as shown in FIG. 9. Alternatively, not shown in FIG. 9, two or more of the cyclonic mixers 184 may be arranged in parallel, rather than in series, and a final cyclonic mixer 184 may be in fluid communication with the parallel cyclonic mixers 184 to form the fuel mixture 166.

Figure 10:
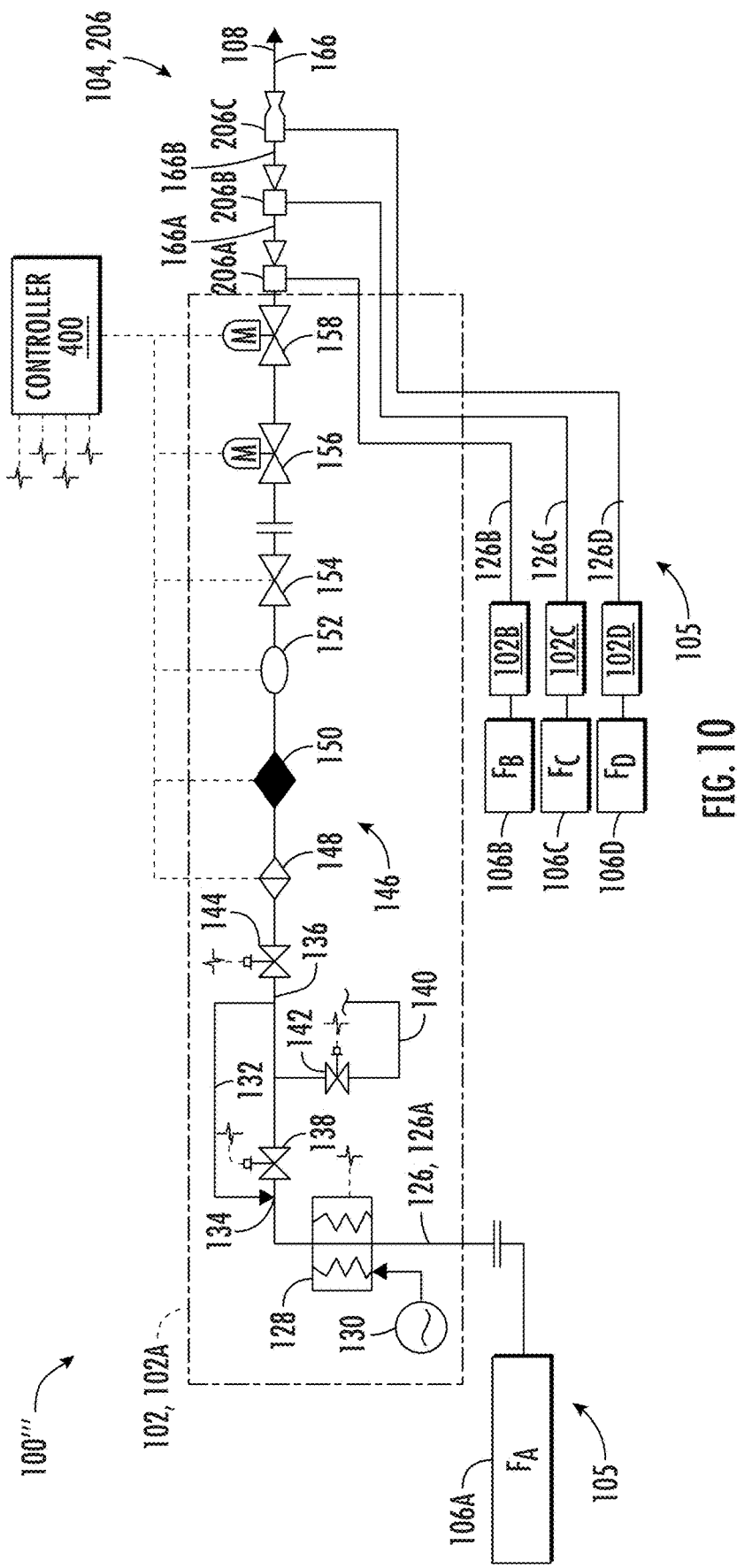
FIG. 10 illustrates a diagram of a fuel supply system and a mixing module for blending multiple fuels in accordance with embodiments of the present disclosure.
Figure 11:
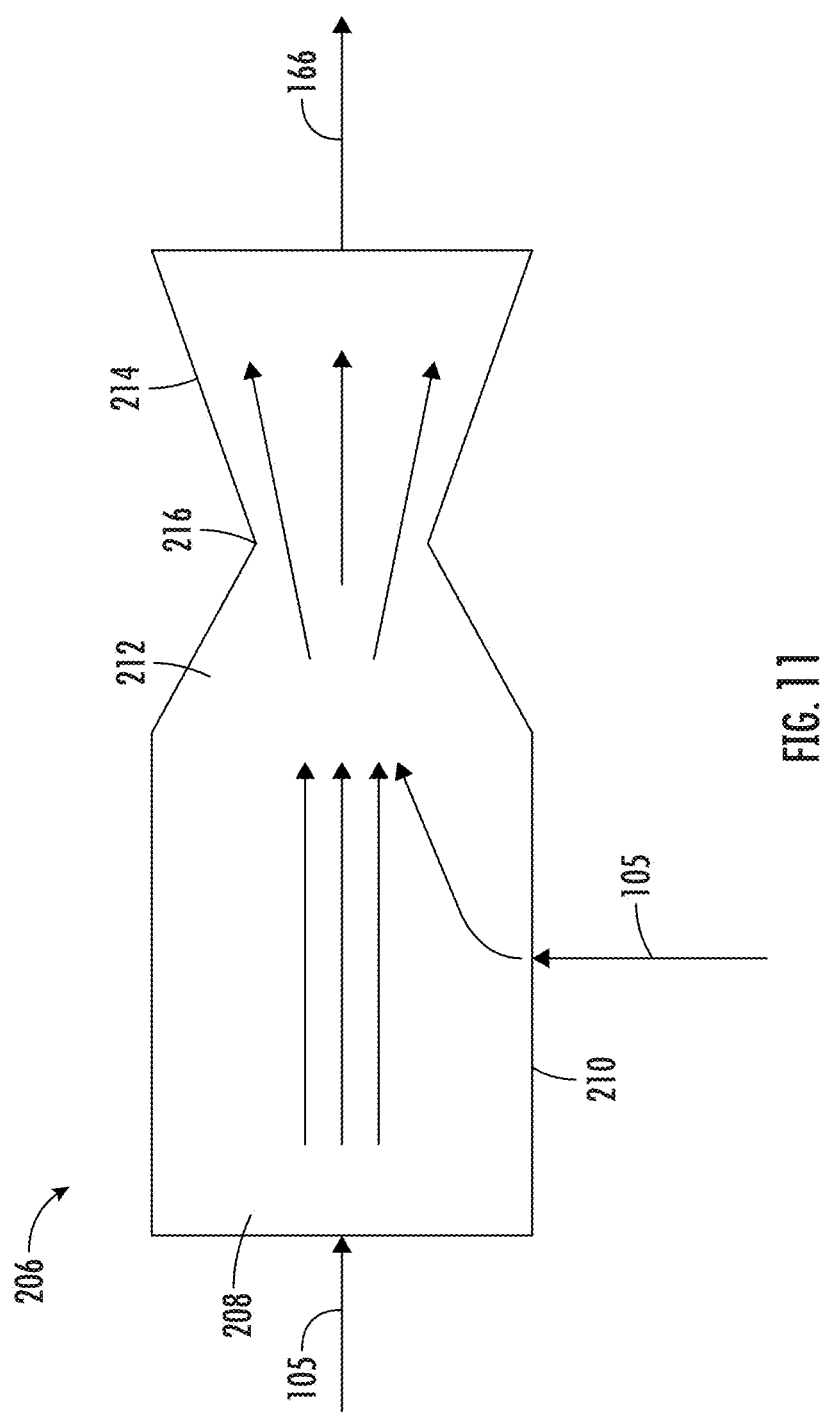
FIG. 11 illustrates a magnified view of a mixing module.

Now referring to FIGS. 10-11, a fuel supply system 100'" shows the mixing module 104 as an eductor 206. FIG. 10 shows a plurality of eductors 206 arranged in a series configuration. The series of eductors 206 may include a first eductor 206A, a second eductor 206B, and a third eductor 206C arranged in series. Each eductor in the series of eductors 206 may be provided with two input streams of fuel 105 and may output a single stream of the fuel as a mixture. For example, the first fuel $F_A$ and the second fuel $F_B$ may be provided to the first eductor 206A as inputs, and the first eductor 206A may provide a first fuel mixture 166A as an output. Similarly, the first fuel mixture 166A and the third fuel FC may be provided to the second eductor 206B as inputs, and the second eductor 206B may provide a second fuel mixture 166B as an output. Furthermore, the second fuel mixture 166B and the fourth fuel $F_D$ may be provided to the third eductor 206C as inputs, and the third eductor 206C may provide a final fuel mixture 166 as an output. The fuel mixture 166 is then provided to the combustion system (FIG. 1) via the outlet line 108.

The eductors 206 are arranged in a series configuration in FIG. 10. Alternatively, it will be appreciated that at least some of the eductors 206 may be arranged in a parallel configuration (not shown in FIG. 10) prior to providing inputs to a final eductor 206 that outputs the homogeneous fuel mixture 166.

Referring to FIG. 11, the eductor 206 includes a motive inlet 208, a suction inlet 210, a converging nozzle 212, a diffuser 214, and a throat 216 connecting the converging nozzle 212 to the diffuser 214. The motive inlet 208 and the suction inlet 210 each receive at least one of the fuels 105. In particular, the fuel 105 provided to the motive inlet 208 is pressurized to drive the fuel 105 provided to the suction inlet 210 to the converging nozzle 212. In such a form, the momentum from the fuel 105 in the motive inlet 208 causes a pressure decrease in the fuel 105 in the suction inlet 210, causing additional fuel 105 to flow into the suction inlet 210. The converging nozzle 212 tapers inward toward the throat 216 such that the fuels 105 are compressed in the converging nozzle 212 and begin to mix. This compression lowers the pressure of the fuels 105 while increasing the speed of the fuels 105. The diffuser 214 tapers outward from the throat 216 such that, as the fuels 105 pass through the throat 216 into the diffuser 214, the fuels 105 expand such that the speed of the fuels 105 drops while the pressure of the fuels 105 increases. This change in speed and pressure, known as the "Venturi effect," increases mixing of the fuels 105, forming a homogeneous fuel mixture 166 that exits the diffuser 214.

Figure 12:
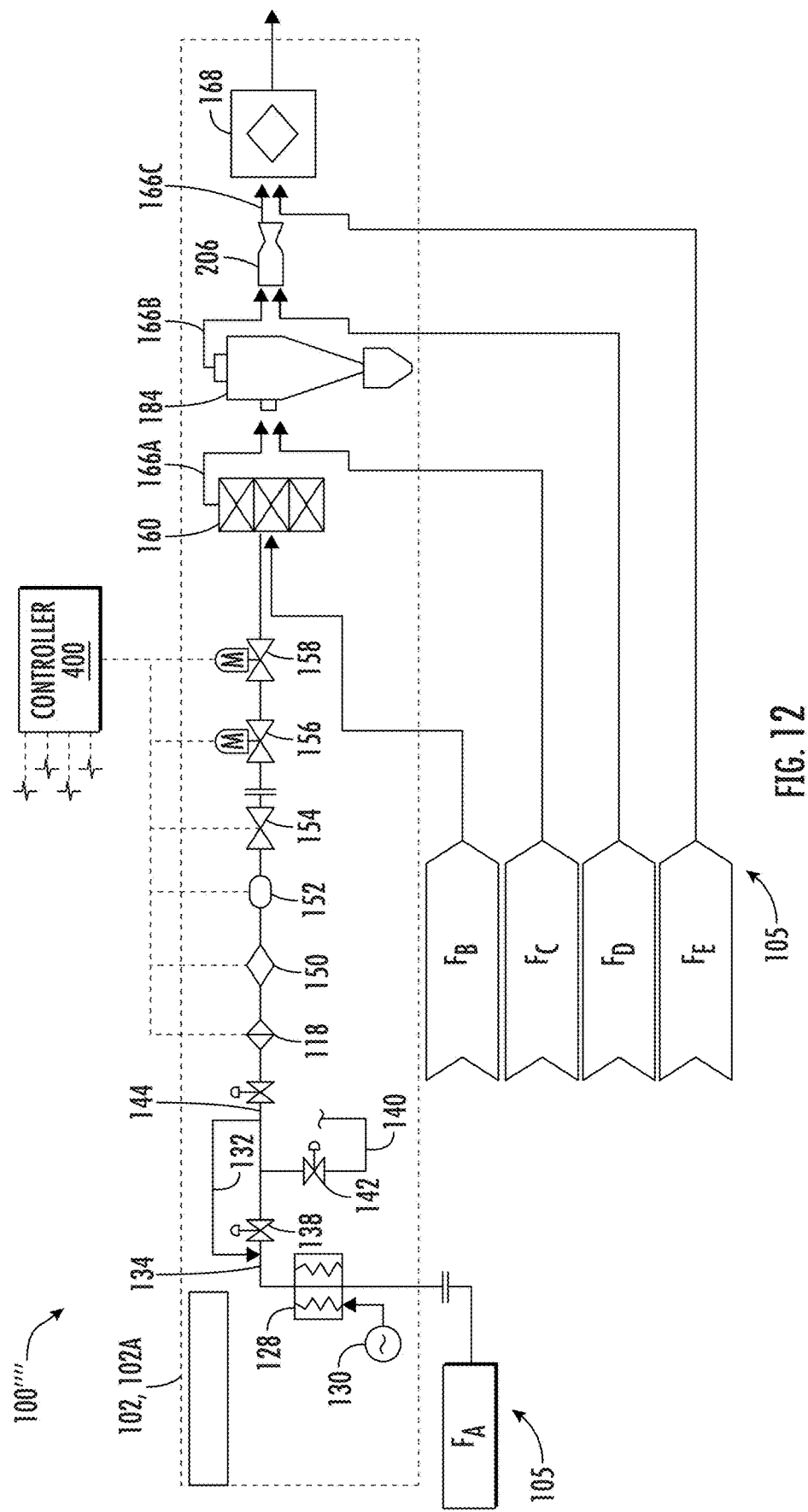
FIG. 12 illustrates a diagram of a fuel supply system with a plurality of different mixing modules in a series configuration.
Figure 13:
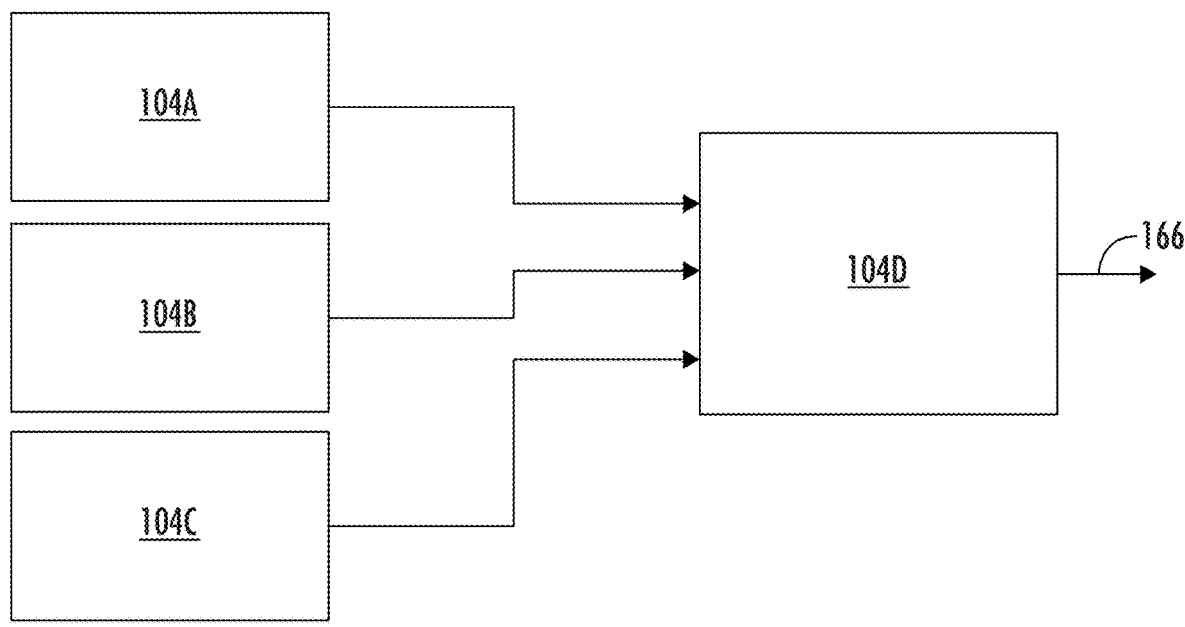
FIG. 13 illustrates a diagram of a fuel supply system with a plurality of different mixing modules in a parallel configuration.

With reference to FIGS. 12-13, a fuel supply system 100'''' is shown where a plurality of different mixing modules 104 may be used to form the fuel mixture 166. FIG. 12 shows a series of mixing modules 104. FIG. 13 shows a parallel arrangement of some of the mixing modules 104 that provide inputs to a single mixing module 104 that outputs the fuel mixture 166.

As shown in FIG. 12, each of the mixing modules 104 may be arranged in a series configuration. By arranging the mixing modules 104 in series, additional fuels 105 may be introduced sequentially with sufficient time to mix into the mixture before being output as the homogeneous fuel mixture 166. FIG. 12 shows the mixing modules 104 as a sequence of a helical static mixer 160, a cyclonic mixer 184, an eductor 206, and a mixing chamber 168 arranged in series. Additionally, two fuels $F_A$, $F_B$ are introduced to the helical static mixer 160 to form a first fuel mixture 166A, which is input with a third fuel $F_C$ to the cyclonic mixer 184 to form a second fuel mixture 166B. Then, the second fuel mixture 166B is input to the eductor 206 with a fourth fuel $F_D$ to form a third fuel mixture 166C, which is input with a fifth fuel $F_E$ to the mixing chamber 168 to form the homogenous fuel mixture 166. Based on the detected interchangeability index, any combination of the fuels 105 and the mixing modules 104 may be adjusted to provide a specific composition for the homogenous fuel mixture 166.

Now referring to FIG. 13, a block diagram of the plurality of mixing modules 104 arranged in parallel is shown. Specifically, the mixing modules 104 are as individual blocks labeled 104A, 104B, 104C, 104D, where the mixing modules 104A, 104B, and 104C are arranged in parallel to provide fuel mixtures to the mixing module 104D. Each of the mixing modules 104A-104D is one of a helical static mixer 160, a mixing chamber 168, a cyclonic mixer 184, or an eductor 206, and at one of the mixing modules 104A-104D is a different type than another of the mixing modules 104A-104D. Accordingly, any combination of helical static mixers 160, mixing chamber 168, cyclonic mixers 184, and eductors 206, may be used to produce the homogeneous fuel mixture 166. Additionally, while four mixing modules 104 are shown in FIG. 13, it will be appreciated that any number of mixing modules 104 may be arranged in series, parallel, or combinations thereof to produce the homogeneous fuel mixture 166.

In addition to fuels 105, other fluids may be introduced to the mixing modules 104 to provide mitigation for emissions, such as nitrogen oxides ($NO_x$) and sequestration/suppression of CO and $CO_2$. In general, a $NO_x$-reducing fluid acts as a diluent that does not participate in the combustion reaction, absorbing heat generated by the combustion reaction and reducing the overall temperature of the combustion gases. Because the production of $NO_x$ is primarily driven by the temperature of the combustion gases, reducing this temperature reduces the total amount of $NO_x$ in the exhaust gases. Example $NO_x$-reducing fluids include steam, liquid water, nitrogen, ammonia, and combinations thereof. In particular, when used in an EGR system, ammonia that is added to reduce $NO_x$ production in the exhaust gases may be recirculated to be used as a fuel source. For CO and $CO_2$ control, the fuel mixture may be adjusted to be fuel-lean (reducing CO formation), to include non-carbon based fuels (reducing carbon-based emissions in general), a spark timing may be adjusted to control combustion of the fuel mixture, or combinations of these techniques may be employed.

Additionally, other fluids may be introduced to the mixing modules 104 for Axial Fuel Staging (AFS), in which combustion is augmented for active combustion dynamics mitigation and control, such as adjusting a fuel/air ratio. AFS introduces fuels into a head end of a combustor through a dedicated fuel circuit, which causes axially staged combustion in two distinct zones, improving performed at both baseload and minimum turndown. Other AFS strategies include combining fuels to a predetermined interchangeability index with active inlet power conditioning methodologies for emission suppression and control, such as for $NO_x$, CO, $CO_2$, dynamically blending fuels and with ammonia $NO_x$ suppression techniques and EGR systems to capture ammonia as a fuel, as described above, and to provide fuels for a duct burner or other internal combustion engines.

In addition to emissions control, AFS may be used to control combustion dynamics. Specifically, when fuels combust, resonant acoustic pressure pulses may be generated and radiate to components. The pulses may interfere with combustion, such as by reflecting off the walls of a combustor, creating oscillations in the air/fuel mixture to cause instabilities in the local equivalence ratio, and amplifying resonant waves in future combustion. Providing fuel by AFS reduces the instabilities in fuel introduction, thereby reducing combustion dynamics and improving operation of the engine.

Figure 14:
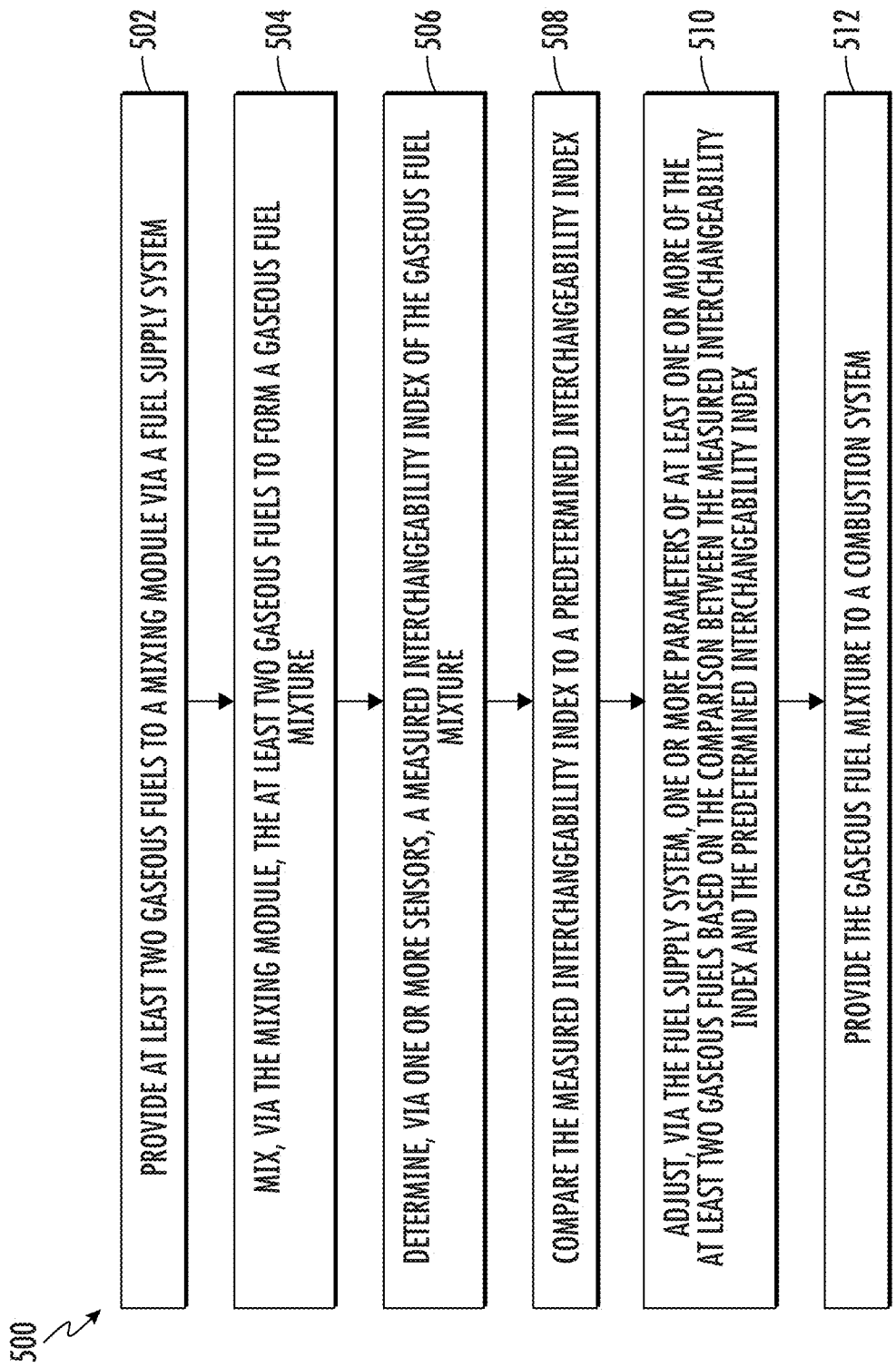
FIG. 14 illustrates a flow chart of a method for blending multiple fuels in accordance with embodiments of the present disclosure.

Referring now to FIG. 14, a flow diagram of one embodiment of a method 500 of blending at least two fuels is illustrated in accordance with embodiments of the present subject matter. In general, the method 500 will be described herein with reference to the system 300, the gas turbine 10, the controller 400, and the fuel supply system 100 described above. However, it will be appreciated by those of ordinary skill in the art that the disclosed method 500 may generally be utilized with any suitable system and/or may be utilized in connection with a system having any other suitable system configuration. In addition, although FIG. 14 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

The method 500 may include at (502) providing at least two fuels to a mixing module via a fuel supply system. The fuel supply system may include a fuel supply circuit for each fuel of the at least two fuels. Each fuel of the at least two fuels may be separately provided to the mixing module via the respective fuel supply circuits. The fuel supply circuits may be capable of modifying the interchangeability index, such as the Wobbe Index, of each individual fuel, thereby allowing for the resulting fuel mixture to meet the desired or predetermined interchangeability index.

The method 500 may further include, at (504) mixing, via a mixing module of the fuel gas blending system. In various embodiments, the mixing module may be at least one of a helical static mixer, a mixing chamber, a solid particle cyclonic gas separator mixer, or an eductor. Mixing at (504) may result in a fuel mixture being formed.

In exemplary implementations, the method 500 may include at (506) determining, via one or more sensors, a measured interchangeability index of the fuel mixture. Additionally, at (508) the method 500 may include comparing the measured interchangeability index to a predetermined interchangeability index. For example, if the measured interchangeability index of the fuel mixture is not within predetermined margin (e.g., a 5-10% margin) of the predetermined interchangeability index, then one or more parameters of each fuel may be adjusted to drive the measured interchangeability index towards the predetermined interchangeability index.

Particularly, the method 500 may include at (510) adjusting, via the fuel supply system, one or more parameters of at least one of the at least two fuels based on the comparison between the measured interchangeability index and the predetermined interchangeability index. The one or more parameters include at least one of a pressure, a temperature, an amount, and a flow rate. For example, each of these parameters may be adjusted (e.g., via the respective fuel supply circuits 102A, 102B, 102C, 102D described above) for each of the at least two fuels based on the comparison between the measured interchangeability index and the predetermined interchangeability index. In many implementations, adjusting at (510) may include adjusting a temperature of at least one of the at least two fuels via an electric heater disposed in thermal communication on the fuel supply circuit. In other implementations, adjusting at (510) may include adjusting an amount of at least one of the at least two fuels provided to the mixing module by modulating a control valve disposed in fluid communication on the fuel supply circuit.

In various implementations, the method 500 may further include (e.g., as a finals step) providing the fuel mixture to a combustion system. In exemplary implementations, the combustion system may be the combustion section of a gas turbine.

Figure 15:
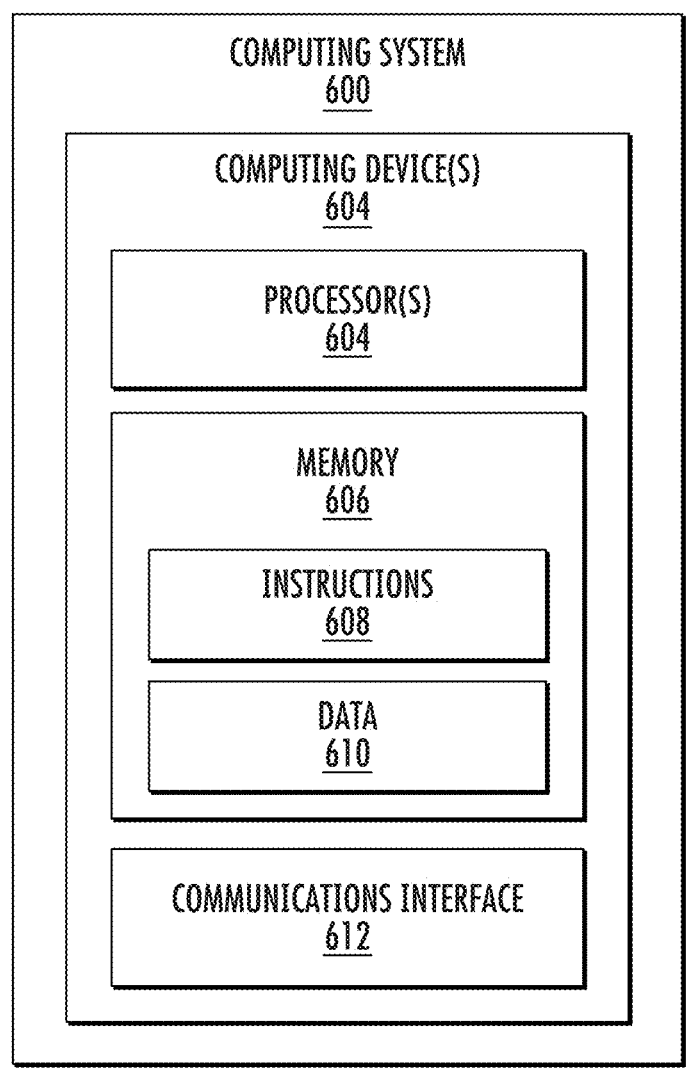
FIG. 15 illustrates a block diagram of a computing system for implementing one or more aspects of the present disclosure according to example embodiments of the present disclosure.

FIG. 15 provides a block diagram of an example computing system 600. The computing system 600 can be used to implement the aspects disclosed herein. The computing system 600 can include one or more computing device(s) 602. The controller 400 discussed above with reference to FIGS. 1 through 12 may be constructed and may operate in a same or similar manner as the computing system 600, for example.

As shown in FIG. 15, the one or more computing device(s) 602 can each include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable medium or media, RAM, ROM, hard drives, flash drives, and other memory devices, such as one or more buffer devices.

The one or more memory device(s) 606 can store information accessible by the one or more processor(s) 604, including computer-readable or computer-executable instructions 608 that can be executed by the one or more processor(s) 604. The instructions 608 can be any set of instructions or control logic that when executed by the one or more processor(s) 604, cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations.

The memory device(s) 606 can further store data 610 that can be accessed by the processor(s) 604. For example, the data 610 can include sensor data such as engine parameters, model data, logic data, etc., as described herein. The data 610 can include one or more table(s), function(s), algorithm(s), model(s), equation(s), etc. according to example embodiments of the present disclosure.

The one or more computing device(s) 602 can also include a communication interface 612 used to communicate, for example, with the other components of the system, such as the sensors, the mixing module, the valves, the electric heater, the heat exchanger, or other components. The communication interface 612 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method of blending at least two fuels, the method including providing at least two fuels to a helical static mixer via a fuel supply system, the fuel supply system including a fuel supply circuit for each fuel of the at least two fuels, mixing, via a plurality of helical structures of the helical static mixer, the at least two fuels to form a fuel mixture, determining, via one or more sensors, a measured interchangeability index of the fuel mixture, the interchangeability index being one of a measured Wobbe Index of the fuel mixture or a measured Modified Wobbe Index of the fuel mixture, comparing the measured interchangeability index to a predetermined interchangeability index, adjusting, via the fuel supply system, one or more parameters of at least one of the at least two fuels based on the comparison between the measured interchangeability index and the predetermined interchangeability index, and providing the fuel mixture to a combustion system.

The method as in any of the previous clauses, wherein the one or more parameters include at least one of a pressure, a temperature, an amount, and a flow rate.

The method as in any of the previous clauses, wherein adjusting the one or more parameters includes adjusting a temperature of at least one of the at least two fuels via an electric heater disposed in thermal communication on the fuel supply circuit.

The method as in any of the previous clauses, wherein adjusting the one or more parameters includes adjusting an amount of at least one of the at least two fuels provided to the helical static mixer by modulating a control valve disposed in fluid communication on the fuel supply circuit.

The method as in any of the previous clauses, further including, prior to providing the fuel mixture to the combustion system, providing the fuel mixture from the helical static mixer to a second helical static mixer.

The method as in any of the previous clauses, further including providing the fuel mixture from the helical static mixer to a second helical static mixer, mixing the fuel mixture with another one of the at least two fuels in the second helical static mixer to form a second fuel mixture, and providing the second fuel mixture to the combustion system.

The method as in any of the previous clauses, further including combusting the fuel mixture in the combustion system to form exhaust gases and providing at least some of the exhaust gases to the fuel supply system as one of the at least two fuels.

The method as in any of the previous clauses, further including providing ammonia to the exhaust gases prior to providing the at least some of the exhaust gases to the fuel supply system.

The method as in any of the previous clauses, wherein the fuel supply circuit includes a main fuel supply line, an electric heater disposed in thermal communication on the main fuel supply line and one or more valves disposed in fluid communication on the main fuel supply line downstream of the electric heater, a recirculation line extending from the main fuel supply line, and an atmospheric vent line extending from the main fuel supply line.

The method as in any of the previous clauses, wherein the fuel supply system further includes an outlet line extending from the helical static mixer to the combustion system, wherein a heat exchanger is disposed in thermal communication on the outlet line.

A system for blending at least two fuels, the system including a combustion system, a helical static mixer including a plurality of helical structures, a fuel supply system for supplying at least two fuels to the helical static mixer and the combustion system, the fuel supply system including a fuel supply circuit for each fuel of the at least two fuels, one or more sensors operably connected to the fuel supply system, a controller operably connected to the fuel supply system, the helical static mixer, and the one or more sensors, the controller including the controller including memory and one or more processors, the memory storing instructions that when executed by the one or more processors cause the system to perform one or more operations including providing at least two fuels to the helical static mixer via a fuel supply system mixing, via the plurality of helical structures of the helical static mixer, the at least two fuels to form a fuel mixture, determining, via one or more sensors, a measured interchangeability index of the fuel mixture, the interchangeability index being one of a measured Wobbe Index of the fuel mixture or a measured Modified Wobbe Index of the fuel mixture, comparing the measured interchangeability index to a predetermined interchangeability index, adjusting, via the fuel supply system, one or more parameters of at least one of the at least two fuels based on the comparison between the measured interchangeability index and the predetermined interchangeability index, and providing the fuel mixture to the combustion system.

The system as in any of the previous clauses, wherein the one or more parameters include at least one of a pressure, a temperature, an amount, and a flow rate.

The system as in any of the previous clauses, wherein adjusting the one or more parameters includes adjusting a temperature of at least one of the at least two fuels via an electric heater disposed in thermal communication on the fuel supply circuit.

The system as in any of the previous clauses, wherein adjusting the one or more parameters includes adjusting an amount of at least one of the at least two fuels provided to the helical static mixer by modulating a control valve disposed in fluid communication on the fuel supply circuit.

The system as in any of the previous clauses, further including a second helical static mixer downstream of the helical static mixer, and wherein the one or more operations further include further including providing the fuel mixture from the helical static mixer to the second helical static mixer, mixing the fuel mixture with another one of the at least two fuels via the second helical static mixer to form a second fuel mixture, and providing the second fuel mixture to the combustion system.

The system as in any of the previous clauses, wherein the one or more operations further include combusting the fuel mixture in the combustion system to form exhaust gases and providing at least some of the exhaust gases to the fuel supply system as one of the at least two fuels.

The system as in any of the previous clauses, wherein the one or more operations further include providing ammonia to the exhaust gases prior to providing the at least some of the exhaust gases to the fuel supply system.

The system as in any of the previous clauses, further including a second helical static mixer and a third helical static mixer, wherein the helical static mixer and the second helical static mixer are in fluid communication with the third helical static mixer.

The system as in any of the previous clauses, wherein the fuel supply circuit includes a main fuel supply line, an electric heater disposed in thermal communication on the main fuel supply line and one or more valves disposed in fluid communication on the main fuel supply line downstream of the electric heater, a recirculation line extending from the main fuel supply line, and an atmospheric vent line extending from the main fuel supply line.

The system as in any of the previous clauses, wherein the fuel supply system further includes an outlet line extending from the helical static mixer to the combustion system, wherein a heat exchanger is disposed in thermal communication on the outlet line.

What is claimed is:

1. A method of blending at least two fuels, the method comprising:
   providing at least two fuels to a helical static mixer via a fuel supply system, the fuel supply system including a fuel supply circuit for each fuel of the at least two fuels, the fuel supply circuit including a main fuel supply line, a recirculation line extending from an inlet on the main fuel supply line and an outlet on the main fuel supply line, and an atmospheric vent line extending from the main fuel supply line between the inlet and the outlet;
   mixing, via a plurality of helical structures of the helical static mixer, the at least two fuels to form a fuel mixture;
   determining, via one or more sensors, a measured interchangeability index of the fuel mixture, the interchangeability index being one of a measured Wobbe Index of the fuel mixture or a measured Modified Wobbe Index of the fuel mixture;
   comparing the measured interchangeability index to a predetermined interchangeability index;
   adjusting, via the fuel supply system, one or more parameters of at least one of the at least two fuels based on the comparison between the measured interchangeability index and the predetermined interchangeability index; and
   providing the fuel mixture to a combustion system.

2. The method as in claim 1, wherein the one or more parameters include at least one of a pressure, a temperature, an amount, and a flow rate.

3. The method as in claim 1, wherein adjusting the one or more parameters comprises:
   adjusting a temperature of at least one of the at least two fuels via an electric heater disposed in thermal communication on the fuel supply circuit.

4. The method as in claim 1, wherein adjusting the one or more parameters comprises:
   adjusting an amount of at least one of the at least two fuels provided to the helical static mixer by modulating a control valve disposed in fluid communication on the fuel supply circuit.

5. The method as in claim 1, further comprising, prior to providing the fuel mixture to the combustion system, providing the fuel mixture from the helical static mixer to a second helical static mixer.

6. The method as in claim 1, further comprising providing the fuel mixture from the helical static mixer to a second helical static mixer, mixing the fuel mixture with another one of the at least two fuels in the second helical static mixer to form a second fuel mixture, and providing the second fuel mixture to the combustion system.

7. The method as in claim 1, further comprising combusting the fuel mixture in the combustion system to form exhaust gases and providing at least some of the exhaust gases to the fuel supply system as one of the at least two fuels.

8. The method as in claim 7, further comprising providing ammonia to the exhaust gases prior to providing the at least some of the exhaust gases to the fuel supply system.

9. The method as in claim 1, wherein the fuel supply circuit includes an electric heater disposed in thermal communication on the main fuel supply line upstream of the recirculation line and one or more valves disposed in fluid communication on the main fuel supply line downstream of the electric heater.

10. The method as in claim 1, wherein the fuel supply system further includes an outlet line extending from the helical static mixer to the combustion system, wherein a heat exchanger is disposed in thermal communication on the outlet line.

11. A system for blending at least two fuels, the system comprising:
    a combustion system;
    a helical static mixer including a plurality of helical structures;
    a fuel supply system for supplying at least two fuels to the helical static mixer and the combustion system, the fuel supply system including a fuel supply circuit for each fuel of the at least two fuels, the fuel supply circuit including a main fuel supply line, a recirculation line extending from an inlet on the main fuel supply line and an outlet on the main fuel supply line, and an atmospheric vent line extending from the main fuel supply line between the inlet and the outlet;
    one or more sensors operably connected to the fuel supply system;
    a controller operably connected to the fuel supply system, the helical static mixer, and the one or more sensors, the controller including the controller including memory and one or more processors, the memory storing instructions that when executed by the one or more processors cause the system to perform one or more operations including:
        providing at least two fuels to the helical static mixer via a fuel supply system;
        mixing, via the plurality of helical structures of the helical static mixer, the at least two fuels to form a fuel mixture;
        determining, via one or more sensors, a measured interchangeability index of the fuel mixture, the interchangeability index being one of a measured Wobbe Index of the fuel mixture or a measured Modified Wobbe Index of the fuel mixture;
        comparing the measured interchangeability index to a predetermined interchangeability index;
        adjusting, via the fuel supply system, one or more parameters of at least one of the at least two fuels based on the comparison between the measured interchangeability index and the predetermined interchangeability index; and
        providing the fuel mixture to the combustion system.

12. The system as in claim 11, wherein the one or more parameters include at least one of a pressure, a temperature, an amount, and a flow rate.

13. The system as in claim 11, wherein adjusting the one or more parameters comprises:

adjusting a temperature of at least one of the at least two fuels via an electric heater disposed in thermal communication on the fuel supply circuit.

14. The system as in claim 11, wherein adjusting the one or more parameters comprises:

adjusting an amount of at least one of the at least two fuels provided to the helical static mixer by modulating a control valve disposed in fluid communication on the fuel supply circuit.

15. The system as in claim 11, further comprising a second helical static mixer downstream of the helical static mixer, and wherein the one or more operations further include further comprising providing the fuel mixture from the helical static mixer to the second helical static mixer, mixing the fuel mixture with another one of the at least two fuels via the second helical static mixer to form a second fuel mixture, and providing the second fuel mixture to the combustion system.

16. The system as in claim 11, wherein the one or more operations further include combusting the fuel mixture in the combustion system to form exhaust gases and providing at least some of the exhaust gases to the fuel supply system as one of the at least two fuels.

17. The system as in claim 16, wherein the one or more operations further include providing ammonia to the exhaust gases prior to providing the at least some of the exhaust gases to the fuel supply system.

18. The system as in claim 11, further comprising a second helical static mixer and a third helical static mixer, wherein the helical static mixer and the second helical static mixer are in fluid communication with the third helical static mixer.

19. The system as in claim 11, wherein the fuel supply circuit includes an electric heater disposed in thermal communication on the main fuel supply line upstream of the recirculation line and one or more valves disposed in fluid communication on the main fuel supply line downstream of the electric heater.

20. The system as in claim 11, wherein the fuel supply system further includes an outlet line extending from the helical static mixer to the combustion system, wherein a heat exchanger is disposed in thermal communication on the outlet line.

\* \* \* \* \*